(12) United States Patent
Pezzillo et al.

(10) Patent No.: US 6,434,621 B1
(45) Date of Patent: Aug. 13, 2002

(54) APPARATUS AND METHOD OF USING THE SAME FOR INTERNET AND INTRANET BROADCAST CHANNEL CREATION AND MANAGEMENT

(75) Inventors: Joseph R. Pezzillo; William P. Snyder, both of Boulder, CO (US)

(73) Assignee: Hannaway & Associates, Boulder, CO (US)

( * ) Notice: Subject to any disclaimer, the term of this patent is extended or adjusted under 35 U.S.C. 154(b) by 0 days.

(21) Appl. No.: 09/282,658

(22) Filed: Mar. 31, 1999

(51) Int. Cl.[7] .............................................. G06F 15/16
(52) U.S. Cl. .......................... 709/231; 725/33; 725/34; 725/35; 725/36
(58) Field of Search .................................. 709/217, 219, 709/229, 231, 223; 725/33, 34, 35, 36

(56) References Cited

U.S. PATENT DOCUMENTS

| | | | | |
|---|---|---|---|---|
| 5,983,005 A | * | 11/1999 | Monteiro et al. ...... | 395/200.61 |
| 6,006,256 A | * | 12/1999 | Zdepski et al. .............. | 709/217 |
| 6,026,439 A | * | 2/2000 | Chowdhury et al. ........ | 709/223 |
| 6,064,379 A | * | 5/2000 | DeMoney ................... | 345/328 |
| 6,088,722 A | * | 7/2000 | Herz et al. ................... | 709/217 |
| 6,115,074 A | * | 9/2000 | Ozkan et al. ................ | 348/465 |
| 6,119,163 A | * | 9/2000 | Monteiro et al. ........... | 709/227 |
| 6,195,692 B1 | * | 2/2001 | Hsu ............................. | 709/219 |
| 6,198,906 B1 | * | 3/2001 | Boetje et al. ................ | 455/3.1 |
| 6,260,192 B1 | * | 7/2001 | Rosin et al. ................... | 725/39 |

* cited by examiner

*Primary Examiner*—Saleh Najjar
(74) *Attorney, Agent, or Firm*—James R. Young

(57) ABSTRACT

A system for enabling Internet or intranet broadcasting that offers audio automation and webcast automation is disclosed. Multiple webcast channels, or stations, can be created and managed, including Internet Radio, Internet Television, and Scheduled Website Publishing. The channels created can use a variety of media sources, including popular Internet streaming formats. The channels are run using a program schedule created by the webcaster, or by using the system to automatically determine a program schedule utilizing criteria provided by the webcaster or listener. The listener logs onto the Website using a Web browser having player software. Time barriers can be inserted in the program schedule to force a program to run at a specific time. A default script runs a default program in the event an off-air condition occurs. Statutory performance license compliance and reporting is automatically provided for along with automatic advertising insertion. Monitoring and alerting functionality is also provided.

23 Claims, 22 Drawing Sheets

APPARATUS AND METHOD OF USING THE SAME FOR INTERNET AND INTRANET BROADCAST CHANNEL CREATION AND MANAGEMENT

FIELD OF THE INVENTION

This invention relates to Internet and intranet broadcasting and more particularly to a system for creating and managing different types of webcast channels. Even more particularly, the invention relates to a system for creating and managing multiple webcast channels that offers audio automation and webcast automation for Internet and intranet broadcasting.

BACKGROUND OF THE INVENTION

A growing component of the World Wide Web is Internet and intranet broadcasting, referred to as webcasting, which is similar to radio and television broadcasting. In webcasting, audio and/or video is sent over the Internet or intranet using a computer system, and is received by listeners using a computer system connected to the Internet or intranet. Simple webcasting operations utilize an already existing audio signal in conjunction with products such as RealServer or NetShow Server from Microsoft® to plug the audio signal into a computer, from which it is streamed continuously by the server over the Internet or intranet. The listener receives the audio and/or video by logging into a webcast Internet or intranet site with a web browser, such as Netscape Navigator or Microsoft® Internet Explorer. The listener's computer receives the audio and/or video and through player software installed on the listener's computer, and is output through speakers and a monitor attached to the listener's computer system.

One existing system is V-cart, offered by Virtual Sound and Video. V-Cart is a software based Digital Audio Cartridge Machine that provides media content for broadcast over the Internet or an intranet channel, also referred to as a station. Designed to replace the traditional radio cart machine, V-Cart has 120 on demand keys for instantaneous access to digital files containing songs, ads, or spots. Multiple shows can be created and loaded for broadcast.

Internet Radio Station in a Box Software Systems (IRSB) offers an Internet ready Digital Automation System that provides a more complete solution for Internet and intranet broadcasting. This system provides software tools for programming a webcast channel, or station, with music, commercials, jingles, disk jockeys, etc. There is also a built-in music scheduler. An optional digital switcher allows access to external sources like network news, reel to reels, cart machines, etc.

Lariat Software, Inc. offers Station Manager, a tool set for live and on-demand streaming media broadcasting. The system offers four tools for recording, producing, scheduling, and delivering audio and video streaming media programs. In addition to providing automation and management controls for incorporating audio and video content into Web sites, Station Manager offers capabilities for creating customized streamed media programs and channels.

The VCR tool in Station Manager records and archives streamed media content. Live media streams can be recorded for on-demand access and archiving. The webcaster can schedule regular recordings and iterate capture times at regular intervals. Blackouts can be created for restricted access to copyrighted materials.

The PlayList tool in Station Manager allows multiple media files to be aggregated into single programs to create unique and targeted programs for insertion into a broadcast schedule. Encoded files can be searched on local and remote servers. Files can be sorted by type, length, size, codec, keyword, and date. Program length can be set according to time slots. A play list is created by specifying a name, description, and total length of the desired program. A search option is then selected to find all encoded media files available for use in building the play list.

The Program Scheduler tool in Station Manager is used to fill in daily, weekly, or monthly programs. It is the central programming tool within Station Manager. Recurring and live programs can be set in the program schedule. Multiple channels can be programmed with targeted content, and are published by Program Scheduler to the Web site. Different intuitive calendar views permit daily, weekly, monthly, and yearly content scheduling. Creating a new channel adds a live broadcast signal to the Web site.

The Program Guide tool in Station Manager is the end users single point of access to streaming media content, and is used to deliver offerings to online audiences. It displays past, current, and future programming to the public, and gives users access to past and current programs. A program reminder option is also offered.

These existing solutions tend to focus either on audio automation or on webcast automation, but not both. In addition, none of the prior art systems address several other important aspects of Internet and intranet broadcasting. With an automated system, when the last show scheduled is finished airing, and nothing has been scheduled to air after it, an off-air condition will result. This is very detrimental to a webcaster who is concerned about presence and audience satisfaction. In order to maintain a continuous broadcast presence, a webcaster must monitor the program schedule to ensure that programs are continually added or looped to prevent an off-air condition.

Another aspect of Internet broadcasting not addressed by prior art systems is the need to override the station's program schedule and force a show or event to occur at a specific time. For example, suppose the webcaster for some reason needs a show to start airing at 10:00 a.m. on tomorrow's program schedule, and there already is a show scheduled to air from 9:30 a.m. to 10:30 a.m. Prior art systems would require the webcaster to delete the 9:30 a.m. to 10:30 a.m. show, insert a new show that will run from 9:30 a.m. to 10:00 a.m., and then insert the show that needs to air at 10:00 a.m. This approach is very cumbersome and inefficient.

Prior art Internet broadcasting systems also do not provide for an automated method for the compliance and reporting requirements for a statutory performance license. These requirements are the result of legislation recently enacted by Congress, commonly referred to as the Digital Millennium Copyright Act (DMCA). Compromises regarding the requirements were reached between the Digital Media Association (DiMA) and the Record Industry Association of America (RIAA), and are embodied in the DMCA and the Sound Recording Performance Complement (SRPC).

The ability to automatically control advertising inserts and associate ads with particular shows or program schedule rules is also lacking in prior art systems. There is also a need to monitor system performance and send alerts to the webcaster regarding the occurrence or pending occurrence of certain events being monitored.

It is thus apparent that there is a need in the art for an improved method or apparatus which solves the off-air condition possible in Internet and intranet broadcasting in an automated fashion. There is a further need in the art for an improved method or apparatus to override an Internet station's program schedule and force a show or live event to occur at a specific time in the future. There is also a need in the art for an automated DMCA/SRPC compliance and reporting method for Internet broadcasting and for a method to automatically control advertising inserts. The present invention meets these and other needs in the art.

SUMMARY OF THE INVENTION

It is an aspect of the present invention to create and manage multiple webcast channels for Internet and intranet broadcasting.

It is another aspect of the invention to utilize a Web browser as a user interface to control the Internet or an intranet broadcasting environment.

Yet another aspect of the invention is to integrate streaming audio and video media program files with live broadcast media in multiple webcast channels for Internet and intranet broadcasting.

Still another aspect of the invention is to provide unattended, remotely scheduled operation of multiple webcast channels for Internet and intranet broadcasting.

A further aspect of the invention is to utilize time barriers to override a webcast channel's program schedule to force program files to run at particular times.

A still further aspect of the invention is to utilize live barriers to override a webcast channel's program schedule to force a live events to broadcast at a particular times.

A further aspect of the invention is to provide an auto-schedule to run a batch file to be aired in a continuous loop.

Another aspect of the invention is to provide a default script to run a default show in the event that there is no auto-schedule or the auto-schedule fails to prevent an off-air condition.

Another aspect of the invention is to automatically provide Sound Recording Performance Complement compliance and reporting for a statutory performance license for Internet and intranet broadcasting.

Another aspect of the invention is to automatically insert advertising within scheduled programs or according to schedule rules.

Another aspect of the invention is to provide alerts when a monitored condition is encountered.

Another aspect of the invention is to actively and passively profile a listener of a webcast channel in order to customize what the listener sees and hears in subsequent accesses to the webcast channel.

The above and other aspects of the invention are accomplished in a system for enabling network broadcasting, such as on the Internet or an intranet. In the preferred embodiment of the invention, a standard Web browser software user interface is utilized. One skilled in the art will recognize that any other suitable user interface could be written and used with the present invention. Multiple webcast channels, or stations, can be created and managed, including Internet Radio, Internet Television, and Synchronized Website Publishing. The channels created can use a variety of media sources, including popular Internet streaming formats, such as Moving Pictures Experts Group-3 (MPEG-3 or simply MP3, which is an ISO/ITU standard version of an encoding format optimized for audio), RealAudio, and Microsoft® NetShow™. The channels can be run using a program schedule created by the webcaster, or by using the system to automatically determine a program schedule utilizing criteria provided by the webcaster. The user interface to the system is a standard Web browser, such as Netscape Navigator or Microsoft® Internet Explorer. The current system will run under the Windows NT™ or UNIX®/Linux operating systems. The listener accesses the stations from a computer utilizing a standard Web browser and loaded with player software that can handle the streaming media formats.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

Figure 1:
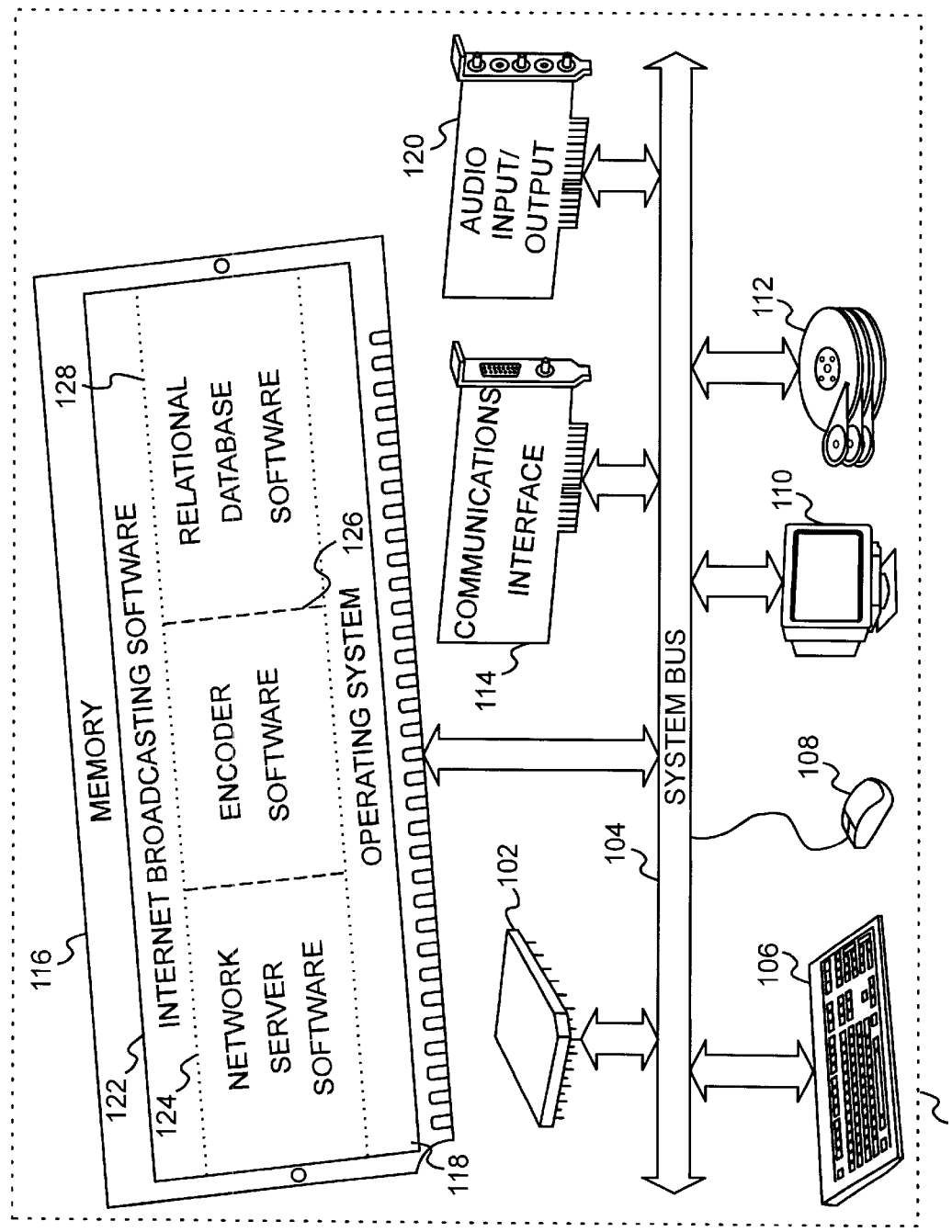
FIG. 1 shows a block diagram of a typical configuration of the computer system for creating and managing multiple webcast channels that offers audio automation and webcast automation for Internet and intranet broadcasting.

The following description is of the best presently contemplated mode of carrying out the present invention. This description is not to be taken in a limiting sense but is made merely for the purpose of describing the general principles of the invention. The scope of the invention should be determined by referencing the appended claims.

"Manage Stations" is the primary component of the system for enabling Internet and intranet webcasting for creating and managing station operations. Various tools are presented to the webcaster under this component. A "New Station" command is used to create a station and for specifying the settings appropriate for the station.

Before scheduling for the station can begin, source material must be added to the system. Source material already created, such as RealMedia clips, can be transferred by File Transfer Protocol/File Transfer Program (FTP), or any other appropriate transfer method, into the system Contents Database. Source material can also be captured from various sources directly into the system Contents Database. Scheduling can then begin.

After a station is created, it can be selected for program schedule creation. The scheduling option allows editing of the programming content for the station. There are three primary methods of viewing a program schedule, each with different applications. A full-week view provides a multi-day overview of upcoming programming. A list view enables operations on multiple shows simultaneously. A today view, which shows the program schedule for the current day, is the default view.

The today view shows a vertically scrolling list of programming. Programs are displayed in approximate relationship to a program's length, in that a two-hour show is displayed twice as high as a one-hour show, and in conjunction with a color scheme to identify program activity. For example, a currently airing show is displayed in one color, a pending show in another color, a played show in another color, a skipped show in another color, etc.

Shows may be added or scheduled shows deleted from a program schedule editor window. An individual show, a group of shows contained in a batch file, a skeleton file, or a live event may also be added to the program schedule through an insert command. A batch file is a file containing a list of files of shows. A skeleton file is a file that specifies an outline of the categories of programming desired to be aired at specific times. A time barrier or a live barrier may also be added to the program schedule using the insert command. A time barrier can override a station's program schedule and force a show to occur at a specific time. A live barrier can override a station's program schedule and force a live event to occur at a specific time. To air a show, for example, a station with a media source in MP3 format would run the show with this command: "play_local/shows/myshow.mp3".

Once the steps for inserting a command are completed and the webcaster has clicked OK, the program schedule is updated to reflect the changes, showing the program just inserted. To insert a batch file that has been created, the name for the batch file is selected from the station's pop-up list of batch file names. To insert a live event, the webcaster would insert the live event information.

An auto-schedule feature allows a single batch file to be selected and aired in a continuous loop. Using auto-schedule in conjunction with a skeleton file enables the system to dynamically select content from the contents Database.

Time barriers can be used to automate blackouts. For example, if a webcaster is simulcasting the signal of a radio station that has certain restrictions on which programming it is allowed to carry on the Internet, a time barrier followed by pre-recorded programming from the Contents Database can create the required Internet blackout. A skeleton file can be created that includes the daily Internet blackout, and a fixed, series, or to-be-determined program can be inserted.

A default script can be set as a station default setting. In the event an off-air condition arises, the default script causes a default program file to run to prevent the station from going off-air. Other station defaults may also be set by the webcaster, such as how much queue history to store, etc.

Pending file filters are used to insert advertising into scheduled programs. A pending file filter allows the webcaster to specify dynamic pending file modifications, such as adding advertising prior to all show code shows in the pending file. Pending file filters do not impact the program schedule itself. You can remove Pending file filters and the program schedule will remain in tact.

Manage Content is the primary component for providing tools that support the creation and use of media content. Different plug-in modules are presented to the webcaster that are specific to content types, such as RealServer Controls, MP3 tools, Real Content tools, MPEG encoder tools, webcam controls, etc.

An Inventory feature provides access to and information about all programming that can be scheduled in the system. Within Inventory is a Contents Database, which is a database of show codes and of individual show files or show records that add individual program entries. Different transfer methods can be used to modify or add to the Contents Database.

An Advertising feature allows the webcaster to place advertisements, created using traditional production processes, in an Advertising Database. An advertising tool allows a webcaster to associate an ad with a particular show or in conjunction with schedule rules. The Advertising Database allows a webcaster to control advertising inserts and lead-in ads synchronized with the Website, and control MP3 playback to insert an advertisement.

Monitors and Alerts is the primary component for providing tools to monitor real-time performance and historical statistics as well as specify alert action conditions for the system to contact the webcaster in the event a monitored condition has been met. Real-time reports monitor the performance and status of the system, such as the currently airing program, and also includes a variety of reports from the RealServer.

The default graph shows a continuous bar graph of total simultaneous listenership, including high, low, and average figures for today. The graph can be configured to show any statistic available from the system, such as server performance, rebuffering, average bandwidth, and current station programs, start times, and listener counts.

setting an alert allows a webcaster to cause an action when a monitored condition is met. For example, an alert can cause an e-mail to be sent when a low disk space condition is reached, a pager message can be sent when the station is off the air, or an alert can control the serial power relay that can turn on a warning light in a studio indicating they are live on-air.

Help and User Manual is the primary component for providing help to the user regarding different aspects of the system. An index is provided as well as tools to allow the user to search for help on content by topic. Tools are also provided that enable the user to contact and submit bug reports to the system developer.

The webcaster utilizing the current system can passively profile listeners who access the webcaster's stations. If a listener accesses the station via a link from another Website, the current system will remember the link where the listener came from. When that listener accesses the webcaster's station in the future, the advertising the listener is sent by the system can be associated with the linked site.

The system actively profiles the listener by providing the listener with a preferences page, where the listener can choose what they want to hear when they log on and choose other preferences. For example, if the listener prefers amazon.com for online ordering, that preference can be selected by the listener so that when the webcaster offers items for sale, a link to amazon.com is presented to the listener. The listener may select various styles of music as preferences. A listener can select sports, weather, or business information via links provided by the webcaster so that each time the listener logs on, the listener can hear the latest sports, weather, or business news, and receive a custom channel having audio streams in the music styles they have selected.

FIG. 1 shows a block diagram of a typical configuration of a computer system for creating and managing multiple webcast channels that offers audio automation and webcast automation for Internet and intranet broadcasting. Though only one computer system is shown in FIG. 1 for simplicity, there could also be multiple computer systems situated in multiple locations. Referring now to FIG. 1, computer system 100 contains a processing element 102. Processing element 102 communicates to other elements of computer system 100 over a system bus 104. A keyboard 106 allows input of information into computer system 100 and a graphics display 110 allows computer system 100 to output information. A graphical input device 108, typically a mouse, is also used to input information and a storage device 112 is used to store data and programs within computer system 100, including a system Contents Database and an Advertising Database.

Communications interface 114 is connected to system bus 104, and receives and sends information to and from external devices connected to computer system 100 over a computer network, such as a local area network or the Internet. Audio input/output 120 is also connected to system bus 104 and receives and sends audio signals to and from external devices connected to computer system 100. Audio input/output 120 may have single or multiple audio feeds in, and single or multiple audio feeds out. Audio input/output 120 may also have multiple digital audio feeds in and multiple digital audio feeds out.

A memory 116, also attached to system bus 104, contains an operating system 118, such as the Windows NT™ or UNIX®/Linux operating systems. Memory 116 also contains Internet broadcasting software 122 of the present invention, network server software 124, encoder software 126, and relational database software 128. In the preferred embodiment of the invention, network server software 124 is RealNetworks RealServer, encoder software 126 is MPEG-3 Encoder software, and relational database software 128 is SQL software.

Figure 2:
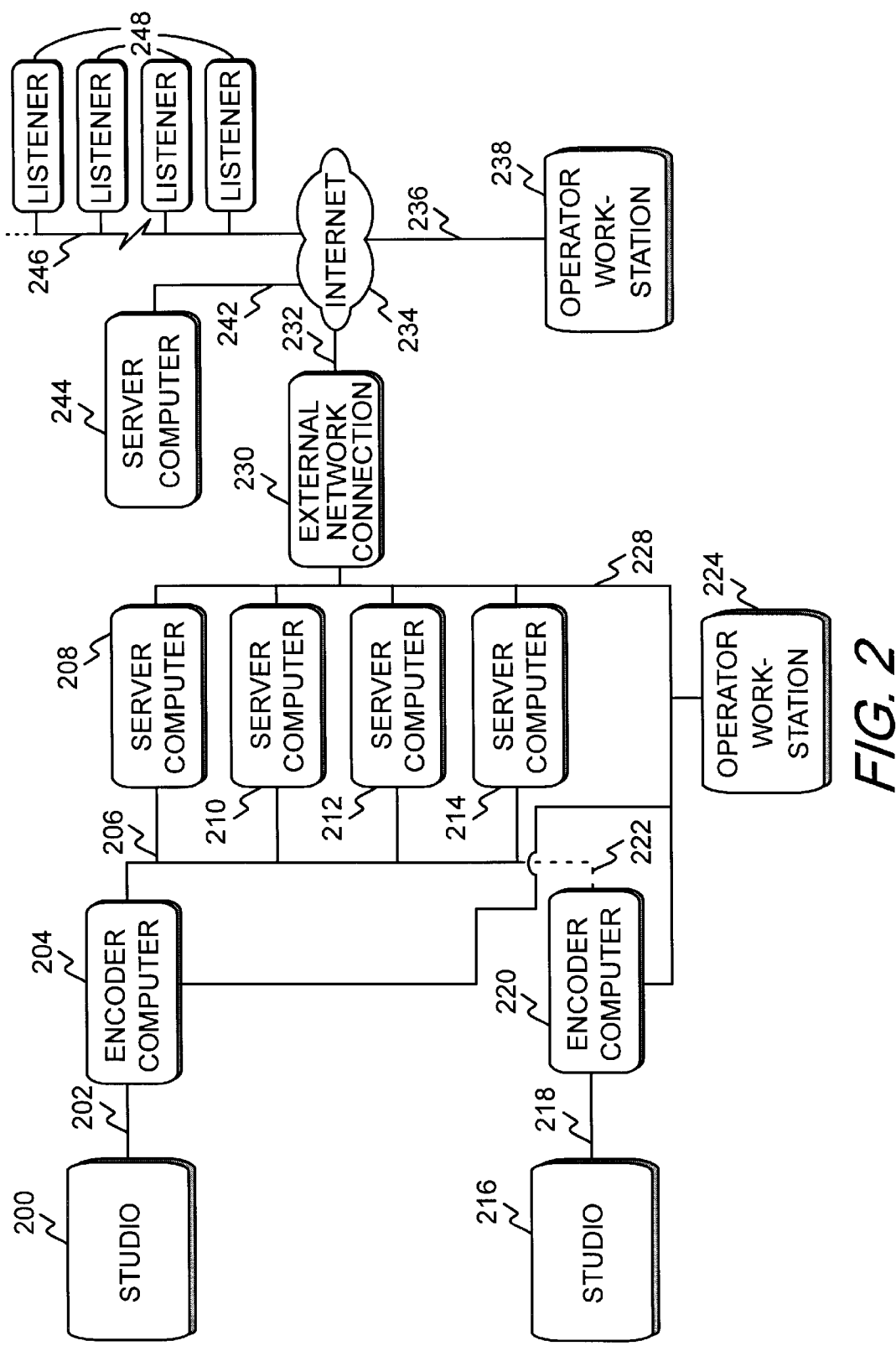
FIG. 2 shows a block diagram of a typical hardware installation for the system for creating and managing multiple webcast channels that offers audio automation and webcast automation for Internet and intranet broadcasting.

FIG. 2 shows a block diagram of a typical hardware installation for the system for creating and managing multiple webcast channels that offers audio automation and webcast automation for Internet and intranet broadcasting. Referring now to FIG. 2, studio 200 generates audio analog signals that are sent to encoder computer 204 over cable 202. Studio 200 may generate audio analog signals from live voices picked up by microphones, or from playback devices, such as cassette tape, CD, phonograph, or reel to reel player/recorders, or a soundboard or audience microphone. A block diagram of encoder computer 204 is shown in FIG. 1. In the installation shown in FIG. 2, encoder computer 204 encodes the analog audio signals received from studio 200 into MP3 format only. Data streams in digital format are sent from encoder computer 204 over network cable 228.

Encoder computer 204 can pass through analog audio signals to server computers 208, 210, 212, and 214 through cable 206. Server computers 208, 210, 212, and 214 also run copies of Internet broadcasting software 122, mainly to manage the encoding and serving rather than managing the program schedule. In any given hardware installation of the system of the present invention, there may be more or less encoder computers and server computers than shown in FIG. 2. All the functions performed by the encoder computers, server computers, and operator workstation 224 can reside on one computer.

Studio 216 also generates audio analog signals that are sent to encoder computer 220 over cable 218. Studio 216 may generate audio analog signals from live voices picked up by microphones, or from playback devices, such as cassette tape, CD, phonograph, or reel to reel player/recorders, or a soundboard or audience microphone. A block diagram of encoder computer 220 is shown in FIG. 1. In the installation shown in FIG. 2, encoder computer 220 encodes the analog audio signals received from studio 216 and outputs only data streams in digital format. An analog audio output can be sent to server computers 208, 210, 212, and 214 with an optional cable 222 as backup.

Encoder computer 204, encoder computer 220, operator workstation 224, and server computers 208, 210, 212, and 214 are all connected to a local area network through network cable 228. Through operator workstation 224, using a standard Web browser, such as Netscape Navigator or Microsoft® Internet Explorer, a user can access any of the computers running a copy of Internet broadcasting software 122 made accessible to the local area network to create and manage multiple webcast stations. Operator workstation 224 normally consists of a computer, graphics display, keyboard, and a graphical input device in a configuration similar to that of FIG. 1. One skilled in the art will recognize that multiple operator workstations 224 could be connected to the local area network in various physical locations.

In the example of FIG. 2, server computer 208 is running a copy of Internet broadcasting software 122 on a UNIX®/Linux platform. Server computer 208 receives a RealAudio feed over network cable 228 and connects to Inter VU, a streaming media service provider, to send streaming digital data back over network cable 228 to external network connection 230.

In the example of FIG. 2, server computer 210 is running a copy of Internet broadcasting software 122 on a Windows NT™ platform. Server computer 210 receives a RealAudio feed over network cable 228 and utilizes Real G2 to send streaming digital data back over network cable 228 to external network connection 230.

In the example of FIG. 2, server computer 212 is running a copy of Internet broadcasting software 122 on a UNIX®/Linux platform. Server computer 212 receives a RealAudio feed over network cable 228 and utilizes RealNetworks RealServer to send streaming digital data back over network cable 228 to external network connection 230.

In the example of FIG. 2, server computer 214 is running a copy of Internet broadcasting software 122 on a Windows NT™ platform. Server computer 214 receives a RealAudio feed over network cable 228 and utilizes Microsoft® NetShow™ to send streaming digital data back over network cable 228 to external network connection 230. One skilled in the art will recognize that any one of the server computers could be utilized alone, or in any combination with each other. In addition, one or more server computers could be located at a remote location, such as server computer 244, which is connected to the Internet 234 through Internet connection 242 which is a secure connection.

Internet connection 232 connects external network connection 230 to the Internet 234. Internet connection 232 could be a single or multiple connection. In the preferred embodiment of the invention, Internet connection 232 is a T1 carrier channel. Operator workstation 238, connected to the Internet 234 through Internet connection 236, is also capable of accessing any of the computers running a copy of Internet broadcasting software 122 made accessible to the Internet to create and manage multiple webcast stations.

Listeners 248 are connected to the Internet 234 through Internet connection 246. By accessing the webcaster's Website through a standard web browser and player software loaded on the listener's computer, listeners 248 can receive any of the multiple channels being webcast or their own custom channel.

Figure 3:
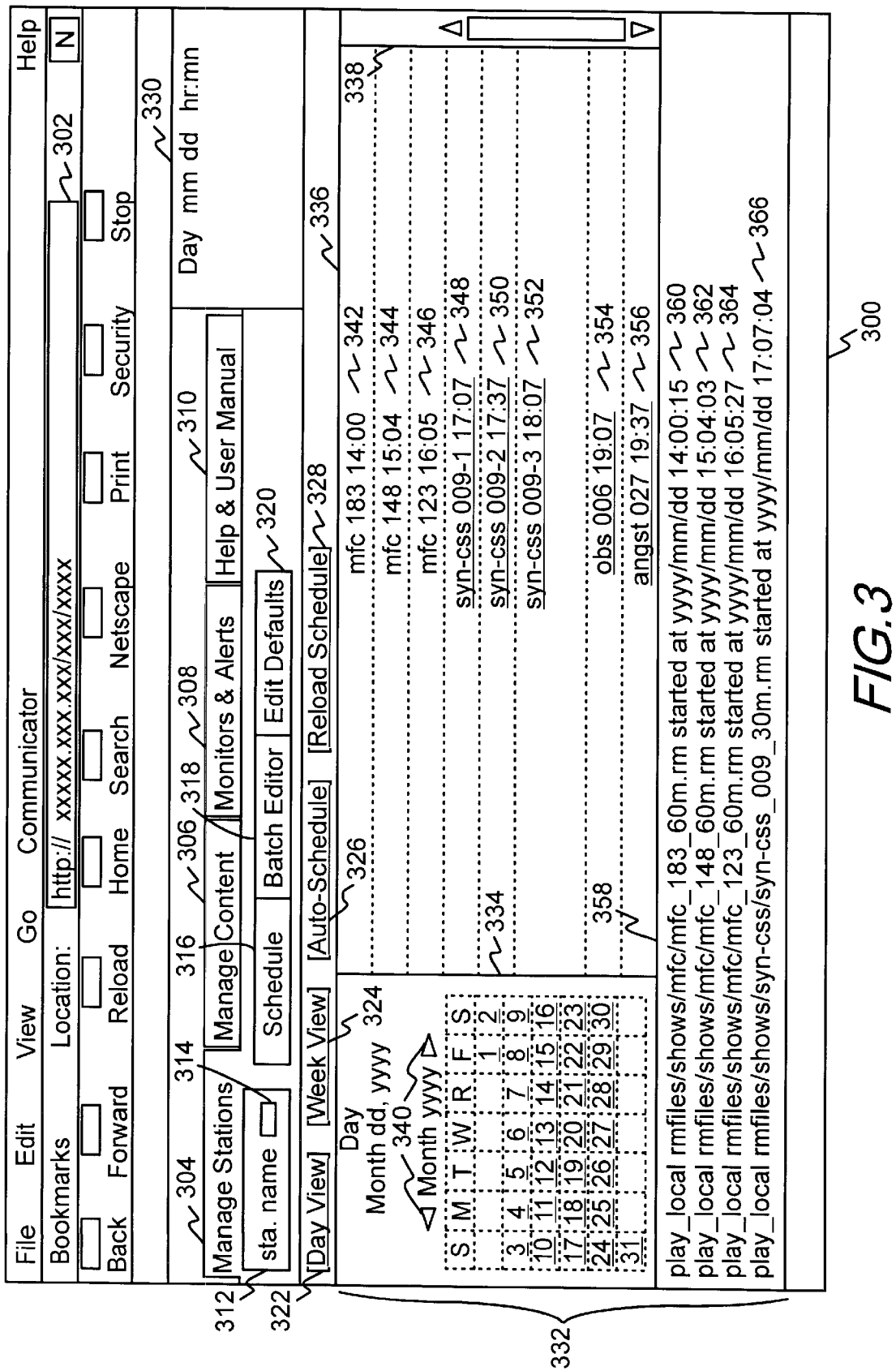
FIG. 3 shows a representation of a screen capture of the Manage Stations component of the system of the present invention showing the Schedule feature in the Day View.

FIG. 3 shows a representation of a screen capture of the Manage Stations component of the system of the present invention showing the Schedule feature in the Day View. The default view is of the current day's program schedule. Referring now to FIG. 3, a user at operator workstation 224 or operator workstation 238, using a Web browser, has utilized an address in location bar 302 to access one of the computers running Internet broadcasting software 122 to display screen display 300. Content 332 is obtained by selecting Manage Stations tab 304, Schedule Button 316, and Day View Option 322 with a graphical input device, such as a mouse, from operator workstation 224 or operator workstation 238. Content 332 pertains to the station displayed in station name box 312. Clicking on station name button 314 accesses a pull down list of the possible multiple stations already set up with Internet broadcasting software 122 on possible multiple computers. Selecting a different station from the pull down list will change content 332 to that of the station selected. Other options available include Week View 324, Auto-Schedule 326, and Reload Schedule 328. Date Box 330 lists the current day name, month, day number, hour, and minute.

Day View Option 322 presents the user with a calendar box 334 showing a month as well as a program schedule box 336 for a single day. Scroll bar 338 allows the user to view different portions of the single day program schedule in program schedule box 336. By clicking on arrows 340 the user can navigate to previous or future months that will be displayed in calendar box 334. By clicking on any numbered day in calendar box 334, the program schedule for that day will appear in program schedule box 336.

Program schedule box 336 consists of a vertical scrolling list of program entries representing shows that have aired, the show that is currently airing, and shows that will air in the future. The user can click on the show names for any show that is currently airing or has yet to air. Clicking on the currently airing show presents the user with a window that allows the user to stop the airing show. This will in turn cause the next show to be started. The start times for subsequent shows, which are estimates, are re-computed each time the schedule is loaded. If there is no next show, the auto-schedule will be scheduled, and if there is no auto-schedule, the default show will be scheduled.

Clicking on a name of a show scheduled to run in the future presents the user with a window that allows the user to perform a variety of actions on the pending file. These actions include: modifying or deleting the selected command; inserting a new command before the selected command; inserting a batch of commands before the selected command; inserting a time barrier before the selected command; and inserting a live barrier before the selected command. Inserting a live barrier requires the user to enter the parameters of the live event at the same time the live barrier is being inserted.

At the end of the schedule in program schedule box 336 is an entry labeled "Add Entry At End" (not shown in FIG. 3). Clicking on this entry opens up a Schedule Editor window which allows a user to insert programming at the end of the program schedule. The user can choose to insert a single show, a batch of shows, a live event, or a barrier.

Program schedule box 336 uses a combination of cell color and cell text for the show entries to represent different show status. A grey cell with white text indicates that a show was played as expected, represented by show entry 342 and show entry 344. A grey cell with black text, represented by show entry 346, indicates that the show played as expected but was preceded by a time barrier or a live barrier. A brown cell with white text indicates a show that was skipped due to a time barrier or a live barrier. A green cell with blue text indicates the currently airing show, represented by show entry 348. A light green cell with blue text indicates a pending show, represented by show entries 350, 352, 354, and 356. A red cell with blue text indicates a show will not air due to an error. A light brown cell with white text appearing in the list higher than the currently airing show, indicating a time in the past, indicates that the default program was aired. A black cell appearing in the list lower than the currently airing show, indicating a time in the future, indicates that there is nothing scheduled and the station could potentially be off-air. The system would attempt to run the auto-schedule when that time arrives. Should the auto-schedule fail, the system would attempt to run the default program. A yellow cell indicates that the show was repeated. In the preferred embodiment of the invention, the color combinations for cells and text are customizable by the user.

Show entries are also shown in approximate relative heights. For example, show entry 352 is one hour in length, and show entry 354 is one-half hour in length. The cell height for show entry 352 is twice as high as the cell height for show entry 354.

Status field 358 presents the user with output from the runner command, which is described in FIGS. 9A, 9B, 9C, 9D, 9E, and 9F. Runner entry 360 indicates that show entry 342 began airing at 14:00:15. Runner entry 362 indicates that show entry 344 began airing at 15:04:03. Runner entry 364 indicates that show entry 346 began airing at 16:05:27. Runner entry 366 indicates that show entry 348, the currently airing show, began airing at 17:07:04.

Figure 4:
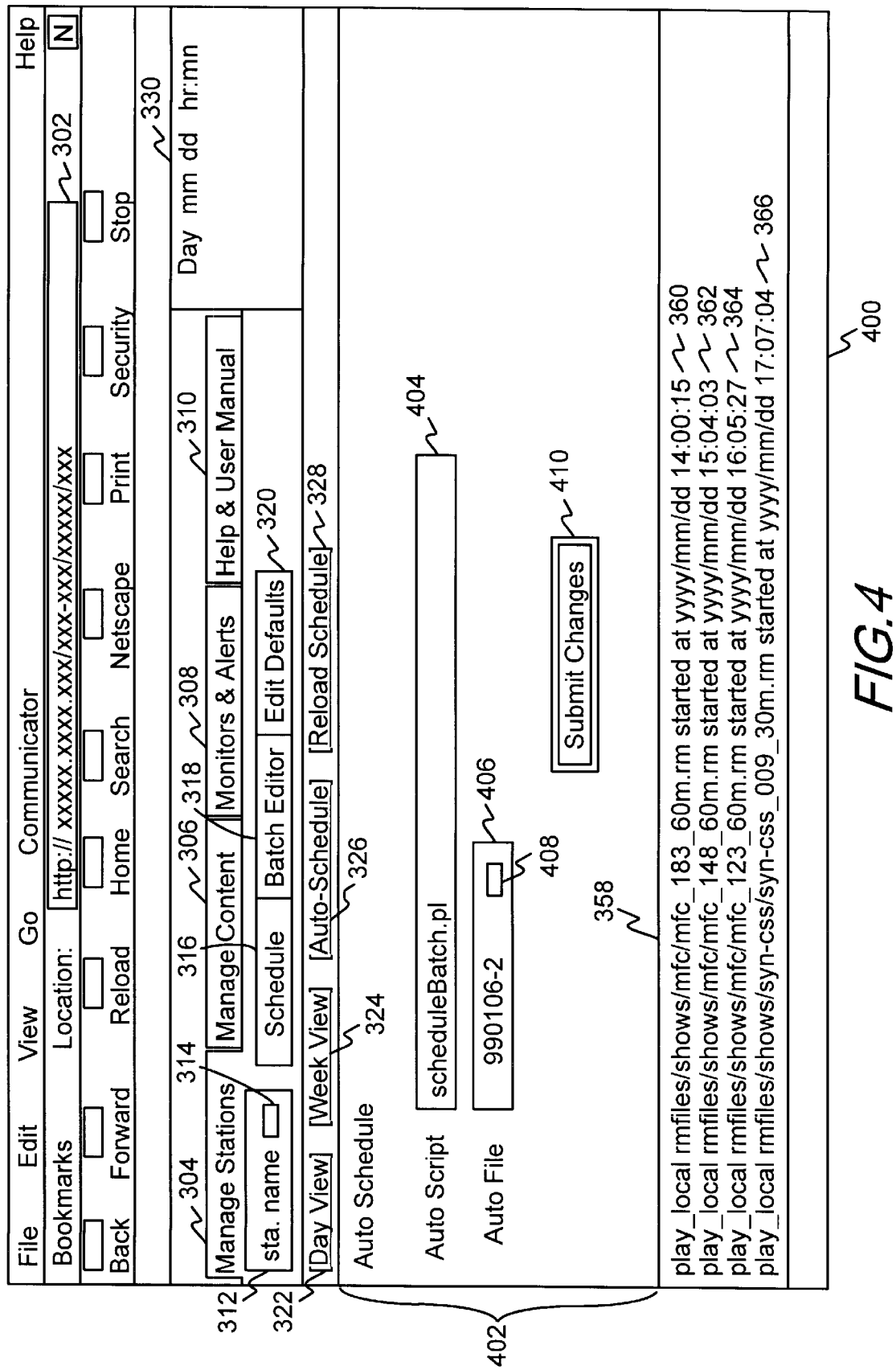
FIG. 4 shows a representation of a screen capture of the Manage Stations component of the system of the present invention showing the auto-schedule feature.

FIG. 4 shows a representation of a screen capture of the Manage Stations component of the system of the present invention showing the auto-schedule feature. Referring now to FIG. 4, a user at operator workstation 224 or operator workstation 238, using a Web browser, has utilized an address in location bar 302 to access one of the computers running Internet broadcasting software 122 to display screen display 400. Content 402 is obtained by selecting Manage Stations tab 304, Schedule Button 316, and Auto-Schedule Option 326 with a graphical input device, such as a mouse, from operator workstation 224 or operator workstation 238. Content 402 pertains to the station listed in station name box 312. Clicking on station name button 314 accesses a pull down list of the possible multiple stations already set up with Internet broadcasting software 122 on possible multiple computers. Selecting a different station from the pull down list will change content 402 to that of the station selected.

Screen display 400 allows a user to enter or modify an auto-schedule script set up as a station's auto-schedule. In the event an off-air condition arises, where there is nothing in the pending file set to air and nothing is currently airing, the auto-schedule script is called and causes a program file to run. This can be used for loop scheduling. Auto script bar 404 contains the current auto script. The auto script is a program that automatically schedules content when the queue is empty. The auto script may schedule a single file, a batch file, or some other combination of files that is user-defined. Auto file bar 406 contains the current auto file. Clicking on auto file button 408 accesses a pull down list of other files that meet the criteria contained in auto script bar 404. Clicking on one of the files in the list will cause that file to become the auto file in auto file bar 406. By clicking on submit changes button 410, any changes made by the user to the auto script or the auto file are enabled and saved.

By changing the auto script a user can modify how the auto-schedule feature inserts shows. For example, the schedBatch.pl script shown in auto script bar 404 does a straight batch insertion, causing the batch file in auto file bar 406 to be aired in a continuous loop. In addition, using the auto-schedule feature in conjunction with a skeleton file causes the system to dynamically select content for airing. A user can create a script, such as schedDayOfWeek.pl, that determines what day it is, and then uses an algorithm to insert scheduling appropriate for that day. This feature insures that the station is always on-air, broadcasting the appropriate content, and allows for fully automatic looped scheduling. If there is no auto-schedule set, the default script set up as the station default setting causes a default program file to run to prevent the station from going off-air.

Figure 5:
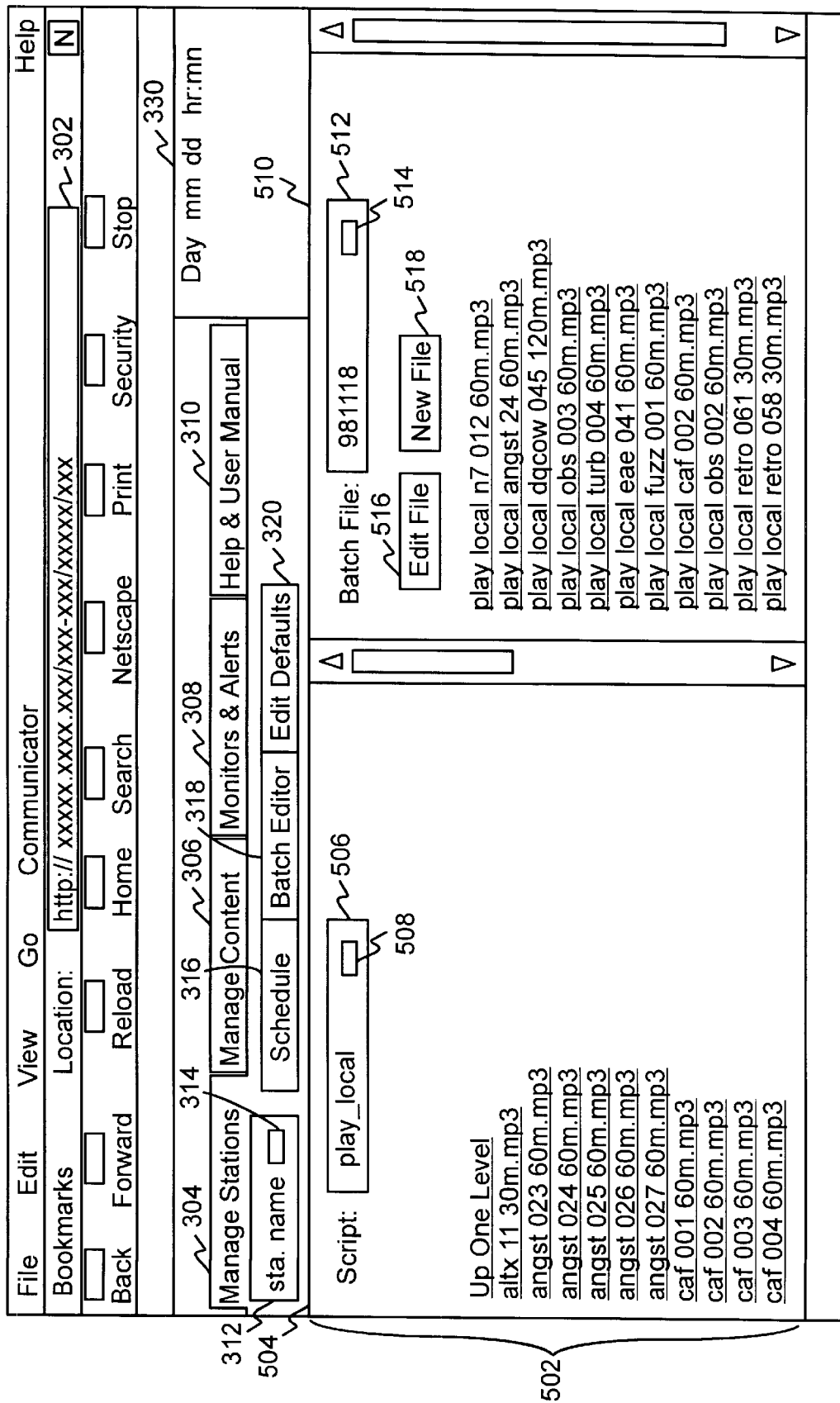
FIG. 5 shows a representation of a screen capture of the Manage Stations component of the system of the present invention showing the Batch Editor feature.

FIG. 5 shows a representation of a screen capture of the Manage Stations component of the system of the present invention showing the Batch Editor feature. Referring now to FIG. 5, a user at operator workstation 224 or operator workstation 238, using a Web browser, has utilized an address in location bar 302 to access one of the computers running Internet broadcasting software 122 to display screen display 500. Content 502 is obtained by selecting Manage Stations tab 304 and Batch Editor Button 318 with a graphical input device, such as a mouse, from operator workstation 224 or operator workstation 238. Content 502 pertains to the station listed in station name box 312. Clicking on station name button 314 accesses a pull down list of the possible multiple stations already set up with Internet broadcasting software 122 on possible multiple computers. Selecting a different station from the pull down list will change content 502 to that of the station selected.

Screen display 500 allows a user to create a batch file. Content window 504 displays, in a hierarchical fashion, the content available to the user from the system Contents Database from the current station shown in station name box 312. Changing the station in station name box 312 causes content window 504 to display the available content for that station from the system Contents Database.

Batch window 510 allows a user to select an existing batch file from the Contents Database or create a new batch file. Batch file bar 512 contains the current batch file name whose contents are currently displayed in batch window 510. Clicking on batch file button 514 accesses a pull down list of existing batch files. Selecting a different batch file from the pull down list will change the content displayed in batch window 510 to that of the batch file selected. Clicking on edit file button 516 makes the batch file contained in batch file bar active for editing. If a user clicks on a file listed in content window 504, that file is added to the contents of the batch file displayed in batch window 510. Script bar 506 contains the tool that will be used to air the content that is being added to the batch file. Clicking on script bar button 508 accesses a pull down list of existing tools. Selecting a different tool from the pull down list will change the content displayed in script bar 506 to that of the tool selected. Clicking on a file listed in batch window 510 will remove that file from the batch. Clicking on new file button 518 allows the user to create a new batch file.

Figure 6:
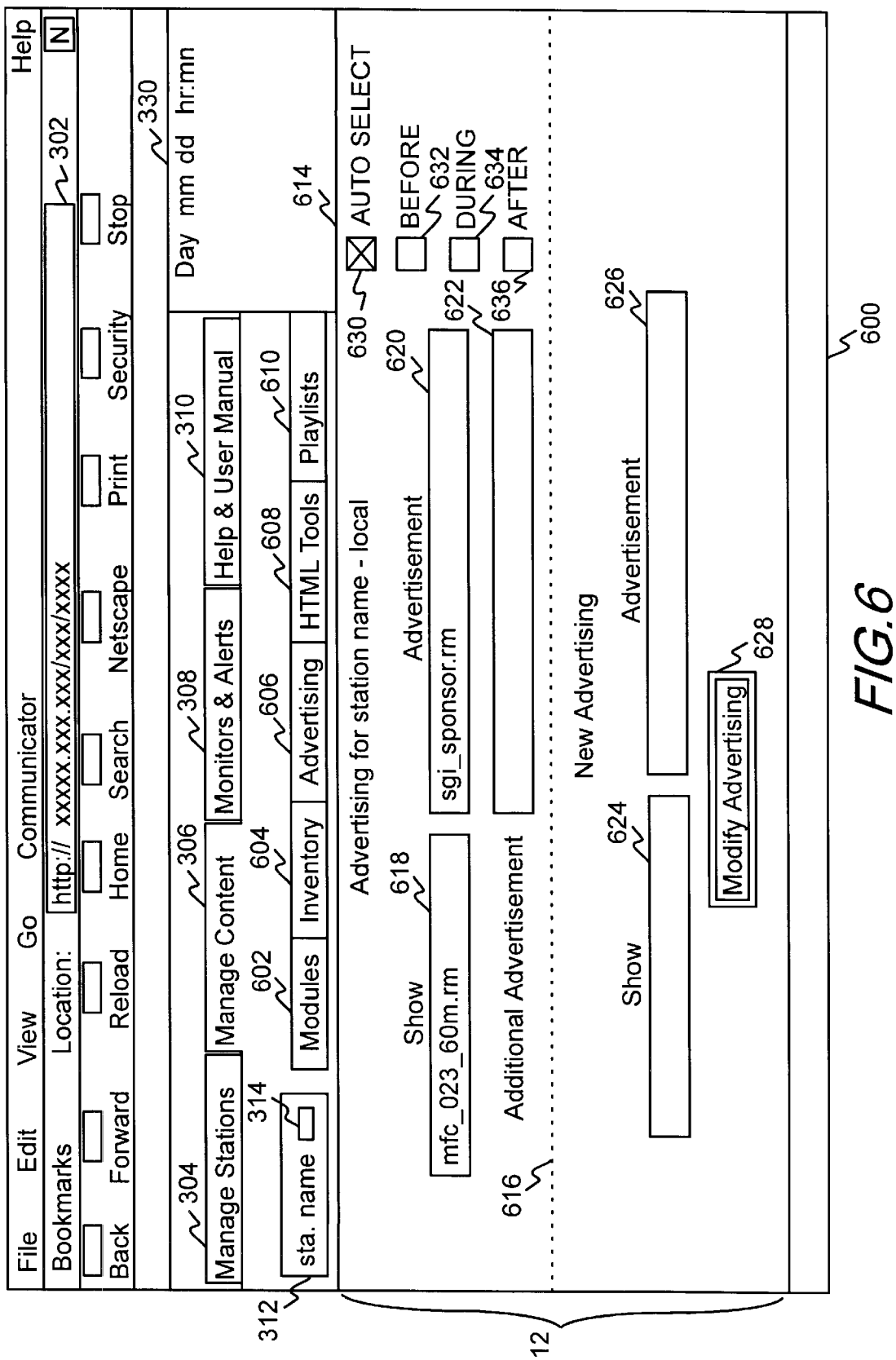
FIG. 6 shows a representation of a screen capture of the Manage Content component of the system of the present invention showing the Advertising Insert feature.

FIG. 6 shows a representation of a screen capture of the Manage Content component of the system of the present invention showing the Advertising Insert feature. Referring now to FIG. 6, a user at operator workstation 224 or operator workstation 238, using a Web browser, has utilized an address in location bar 302 to access one of the computers running Internet broadcasting software 122 to display screen display 600. Content 612 is obtained by selecting Manage Content tab 306 and advertising button 606 with a graphical input device, such as a mouse, from operator workstation 224 or operator workstation 238. Content 612 pertains to the station listed in station name box 312. Clicking on station name button 314 accesses a pull down list of the possible multiple stations already set up with Internet broadcasting software 122 on possible multiple computers. Selecting a different station from the pull down list will change content 612 to that of the station selected.

Manage Content is the primary component for providing tools that support the creation and use of media content. Different plug-in modules are presented to the user by selecting modules button 602. The modules are specific to content types, such as RealServer Controls, MP3 tools, Real Content tools, MPEG encoder tools, webcam controls, etc. Also accessible via modules button 602 is an MPEG encoder status module, an auto-capture from music CD to MP3 module, and a module for capturing webcam images during a live encode.

Selecting inventory button 604 gives the user access to information about all the programming that can be scheduled for a station, which is stored in the system Contents Database. The Contents Database is a database of show codes and of individual show files, or show records, that contain individual program entries. FTP can be used to modify or add content to the Contents Database, or also by using the file system.

Selecting HTML tools button 608 gives the user access to a HTML module for synchronizing HTML with the audio. Selecting playlists button 610 gives the user access to the playlist system, which gives the contents of the show now playing, and manages the music library and integrates compliance checking.

Content 612 contains current advertising section 614 and new advertising section 616. In current advertising section 614, show bar 618 contains the name of the show file of current interest that was entered by the user. Advertisement bar 620 contains the name of the advertisement file associated with the show file in show bar 618 that is stored in the Advertising Database. Additional advertisement bar 622 may contain the name of an additional advertisement file associated with the show file in show bar 618, if any, that is stored in the Advertising Database. As more ads are added to a show file, more additional advertisement bars 622 are added to the display. Clicking on buttons 632, 634, or 636 causes the advertisements to run before, during, or after the show file. Clicking on button 632 allows the system to automatically select insertion of the advertisements before, during, and after the running of the associated show or program.

In new advertising section 616, show bar 624 may contain the name of a show file of current interest with which the user desires to associate an advertisement. New advertisement bar 626 can contain the name of the advertisement file that the user desires to associate with the show file in show bar 624. Modify advertising button 628 allows a user to save changes made. For example, if the user enters the show from show bar 618 in show bar 624, and enters a new advertisement in new advertisement bar 626, upon clicking on modify advertising button 628, the advertisement in new advertisement bar 626 would appear in additional advertisement bar 622, and show bar 624 and new advertisement bar 626 are cleared.

The Advertising Database allows a user to control advertising inserts, lead-in ads, and control MP3 playback to insert an advertisement. When a listener using a Web browser accesses an Internet radio station enabled by the system of the present invention, the playlist transferred over the Internet from the system to the listener's computer contains instructions which tell the player software on the listener's computer what to play. The first entry in the playlist transferred to the listener may be an advertisement, and the second entry accessed by the listener may be one of several live streams. Thus, no matter when a listener tunes in, the first thing that they hear may be an advertisement.

Figure 7:
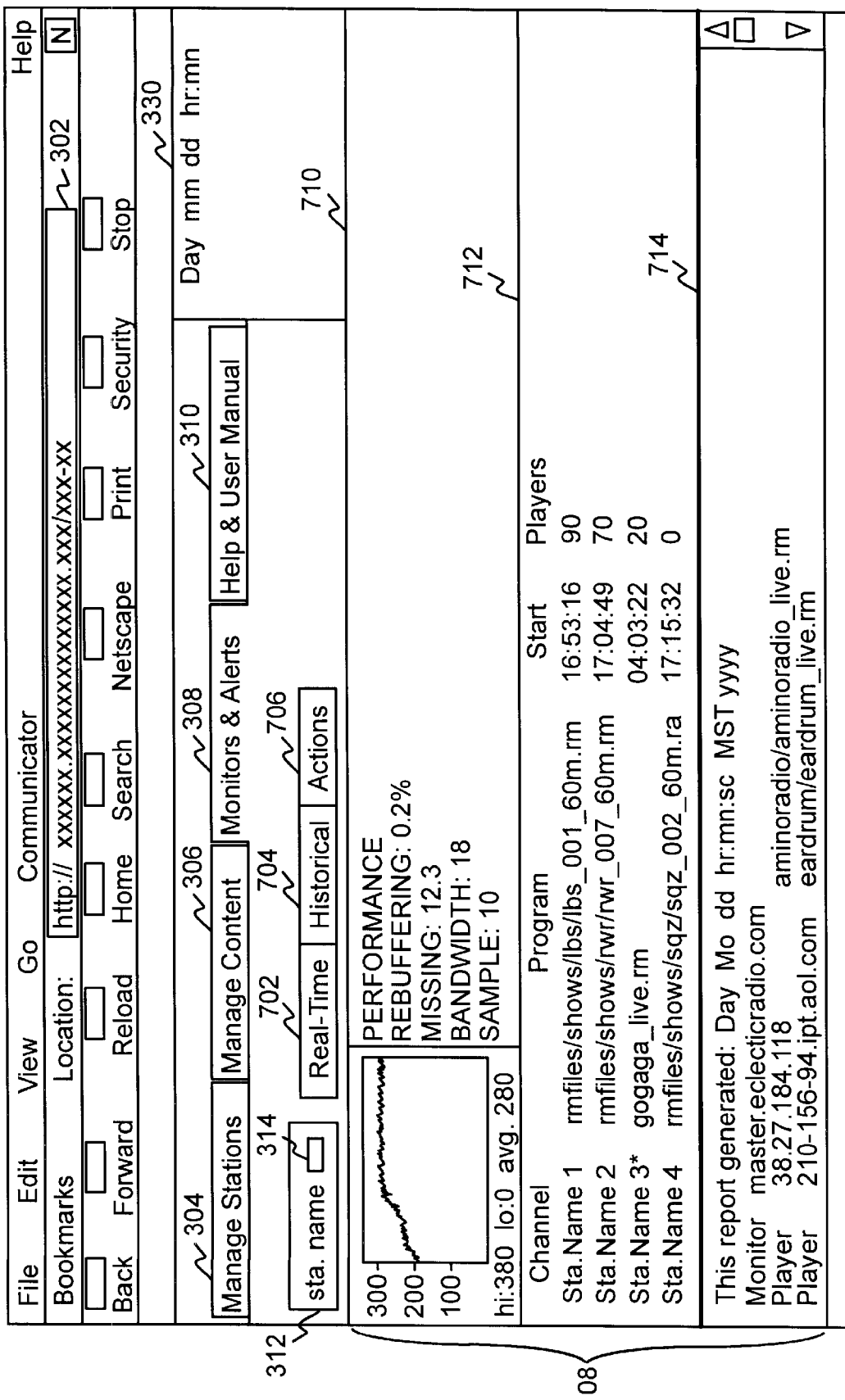
FIG. 7 shows a representation of a screen capture of the Monitors and Alerts component of the system of the present invention showing the Real-Time Performance feature.

FIG. 7 shows a representation of a screen capture of the Monitors and Alerts component of the system of the present invention showing the Real-Time Performance feature. Referring now to FIG. 7, a user at operator workstation 224 or operator workstation 238, using a Web browser, has utilized an address in location bar 302 to access one of the computers running Internet broadcasting software 122 to display screen display 700. Content 708 is obtained by selecting Monitors & Alerts tab 308 and Real-Time button 702 with a graphical input device, such as a mouse, from operator workstation 224 or operator workstation 238. Content 708 pertains to all the stations created by the user. Historical button 704 provides the user with access to the logs and graph statistics. Actions button 706 provide access to the user to set alert conditions, such as low disk space, etc.

The Real-Time Performance feature provides the user with real-time statistics pertaining to the stations that have been set up. Graph section 710 contains a listener count graph with performance statistics for all stations. Summary section 712 contains a summary for each station set up by the system, including the station name, the current program airing, its start time, and the current number of listeners. A live show is denoted by an asterisk after the station name. Detail report section 714 lists all the listeners currently tuned into each of the stations that have been set up.

Figure 8:
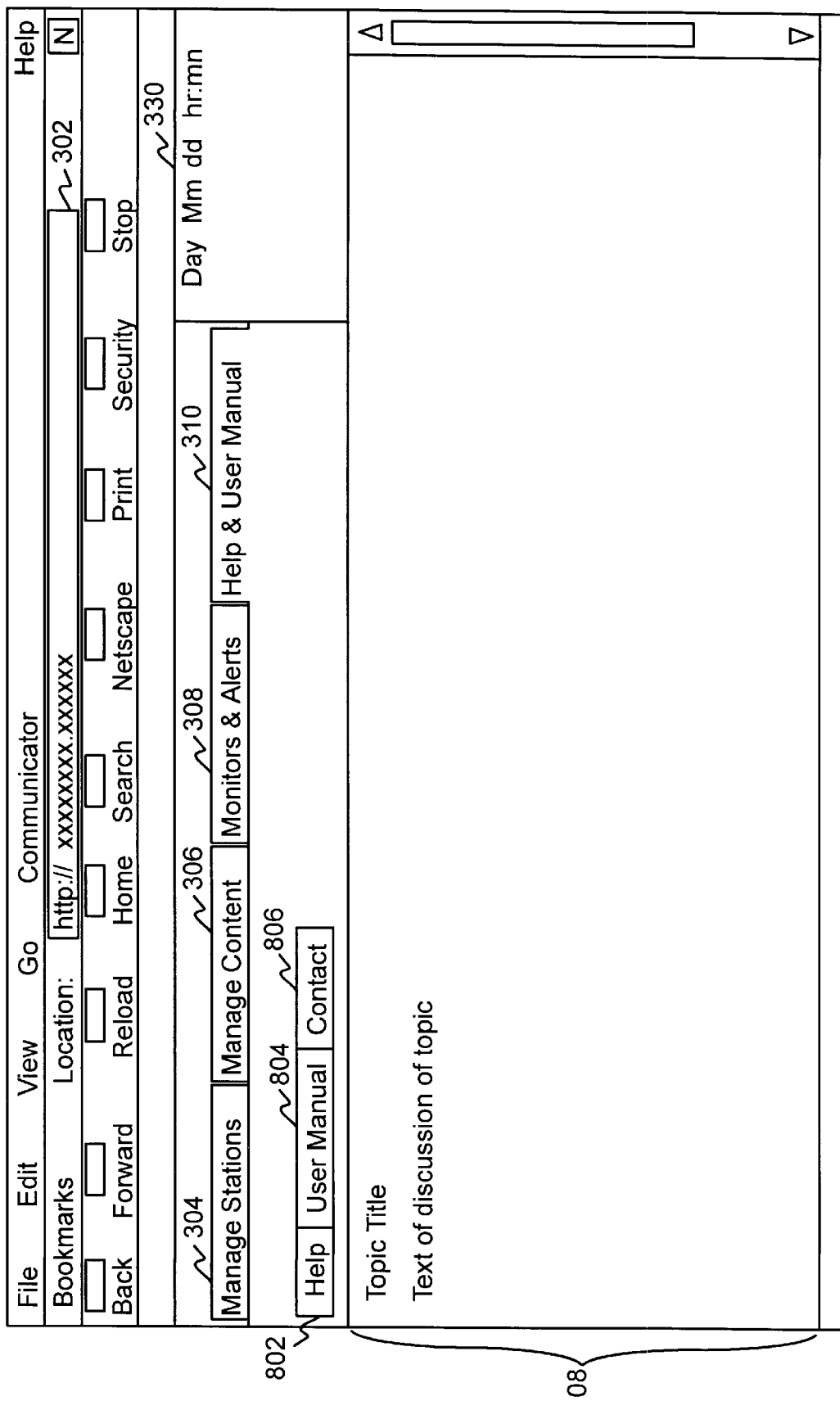
FIG. 8 shows a representation of a screen capture of the Help and User Manual component of the system of the present invention showing the User Manual feature.

FIG. 8 shows a representation of a screen capture of the Help and User Manual component of the system of the present invention showing the User Manual feature. Referring now to FIG. 8, a user at operator workstation 224 or operator workstation 238, using a Web browser, has utilized an address in location bar 302 to access one of the computers running Internet broadcasting software 122 to display screen display 800. Content 808 is obtained by selecting Help & User Manual tab 310 and User Manual button 804 with a graphical input device, such as a mouse, from operator workstation 224 or operator workstation 238. Content 808 pertains to the topic of interest as selected by the user. Clicking on Help button 802 provides general help information to the user. Clicking on Contact button 806 provides access to functionality allowing the user to send e-mail and submit bug reports. An index and search tools are also provided.

FIGS. 9A, 9B, 9C, 9D, 9E, and 9F show a flow chart of the runner command of the system of the present invention.

Before the runner command can be executed for the first time, a station has to be created by the system. If a station is created without a program schedule, the station runs the default program that comes with the system, which is just a tool that causes the system to "sleep" until a schedule is established for the station or another default program is set up.

Once a station is created, the runner command begins execution on a periodic basis. A default period of time is set for an alarm to occur, causing the runner command to execute again. In the preferred embodiment of the invention, the default period of time is five seconds. The runner command may be executed prior to the default period of time running out if a condition arises that causes the runner command to set an alarm before the default period of time would normally run out, or upon the occurrence of a particular event that triggers execution of the runner command prior to the default period of time running out. Examples of an event that will trigger execution of the runner command are a signal sent by the system indicating that a program or show has finished airing, or a request to reinitialize. In an alternative embodiment of the invention, the runner command runs continually but only activates and takes action upon the occurrence of stop events, alarms, or other triggering events.

Figure 9A:
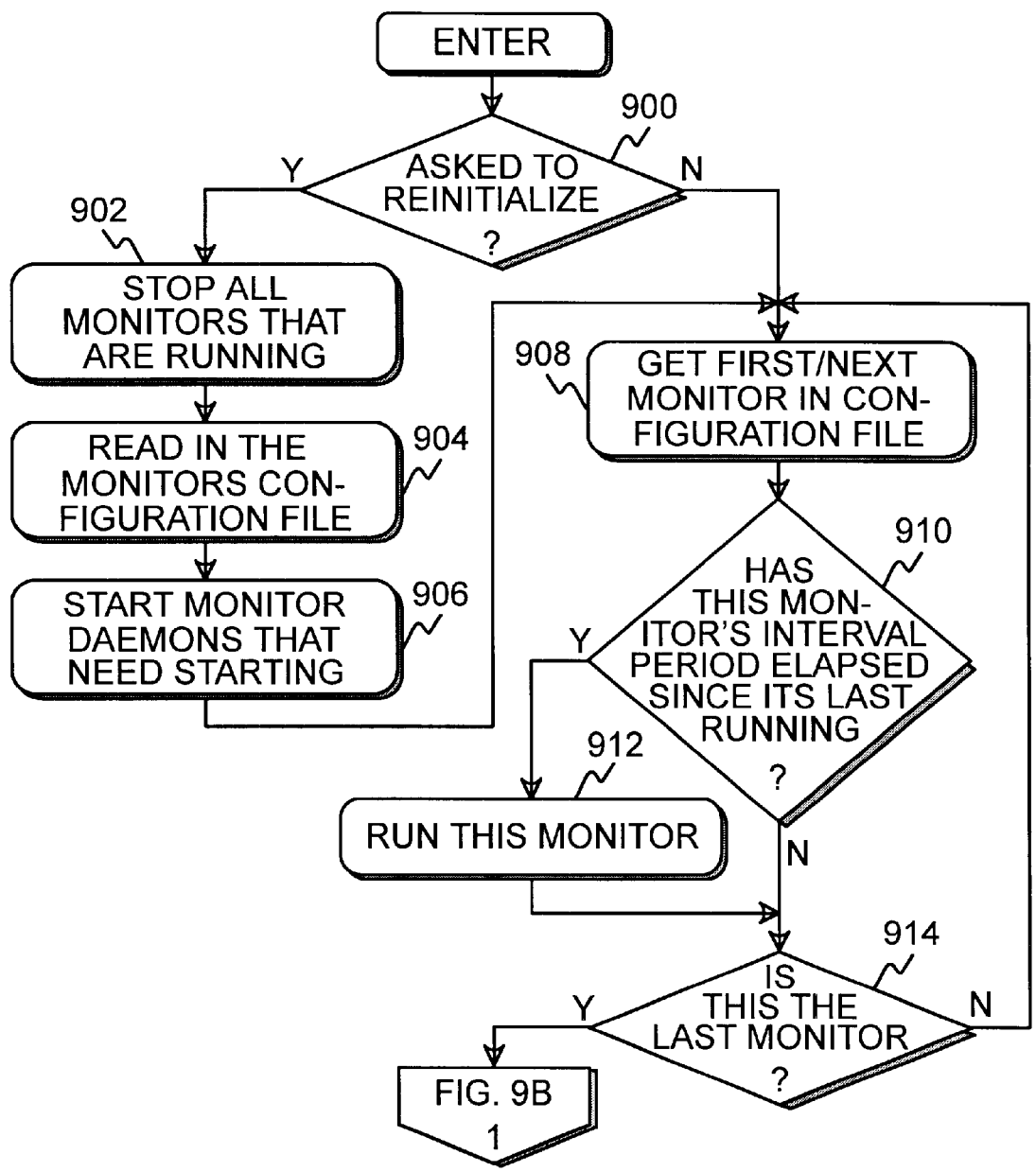
FIGS. 9A, 9B, 9C, 9D, 9E, and 9F show a flow chart of the runner command of the system of the present invention.
Figure 9B:
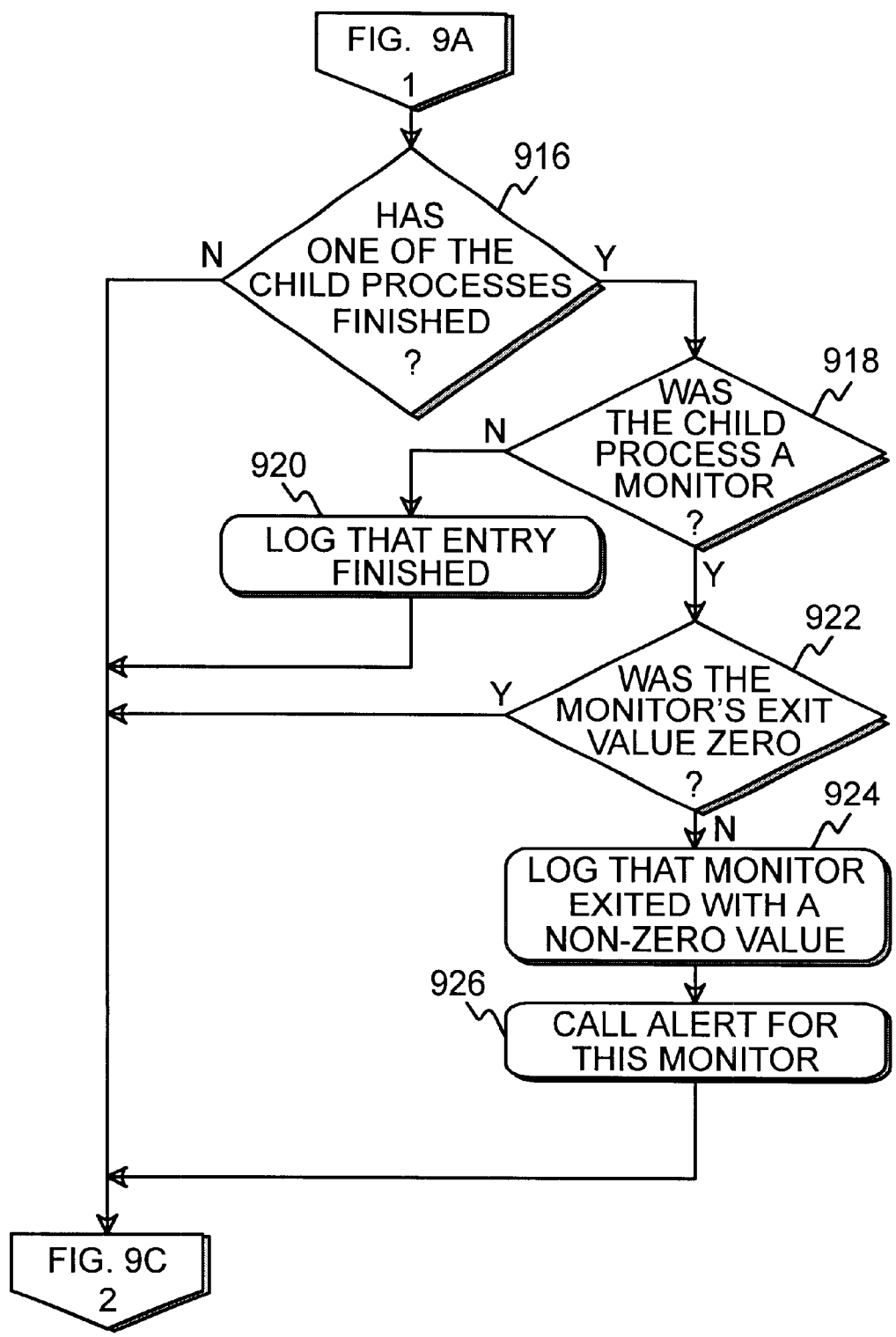

Referring now to FIG. 9A, operating system 118 (FIG. 1) initiates execution of the runner command in step 900, which determines if a request for reinitialization has been received from operating system 118. If yes, then step 902 stops all the monitors that are currently running. Step 904 then reads in the monitor configuration file. Step 906 then starts any monitor daemons that need starting. Control then passes to step 908.

If no request to reinitialize is received in step 900, then step 908 gets the first monitor from the monitor configuration file. Step 910 determines if the interval period for the monitor from step 908 has elapsed since it was last run. If yes, then the monitor from step 908 is run in step 912. Control then passes to step 914.

Figure 9C:
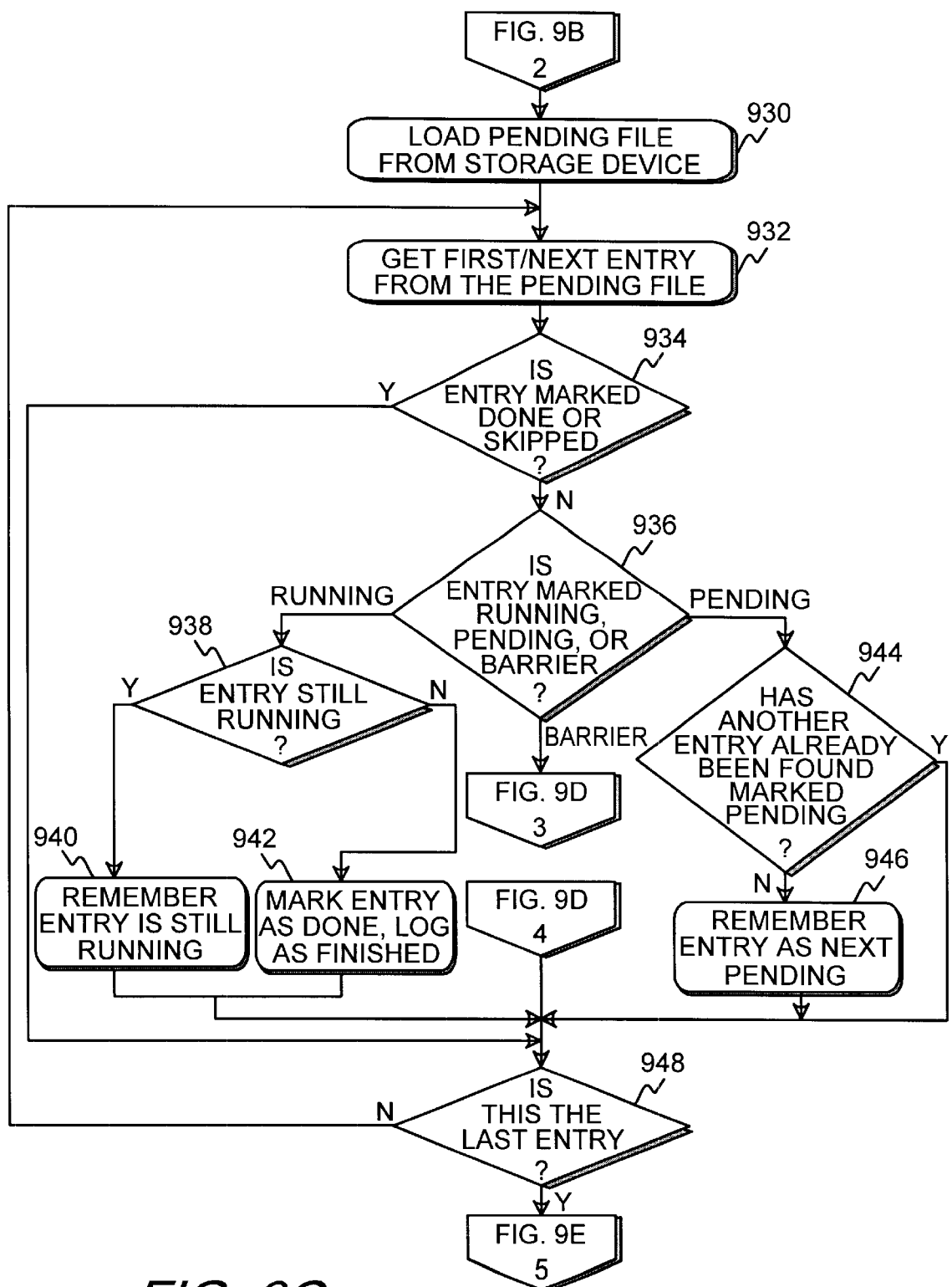
Figure 9D:
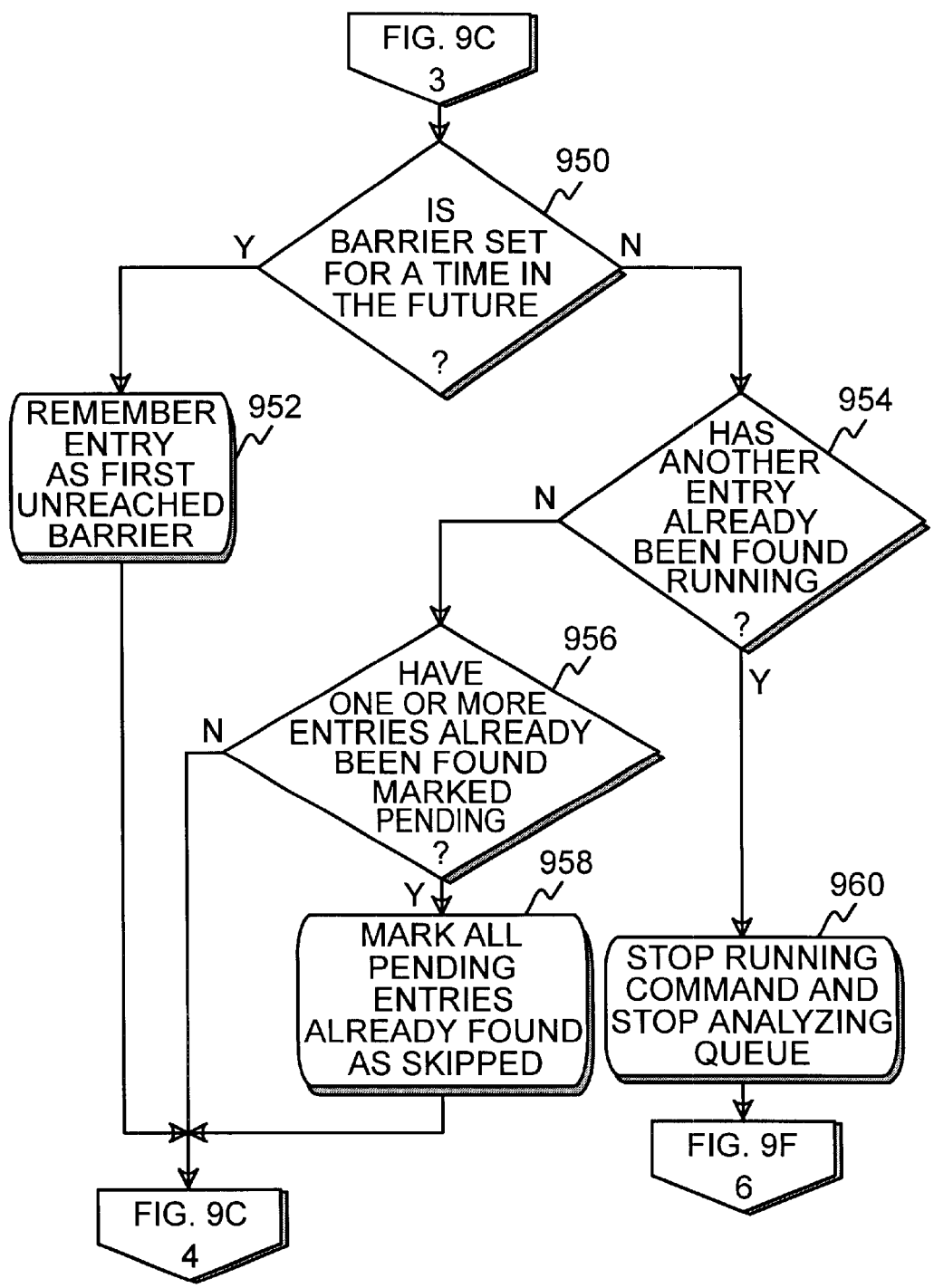
Figure 9E:
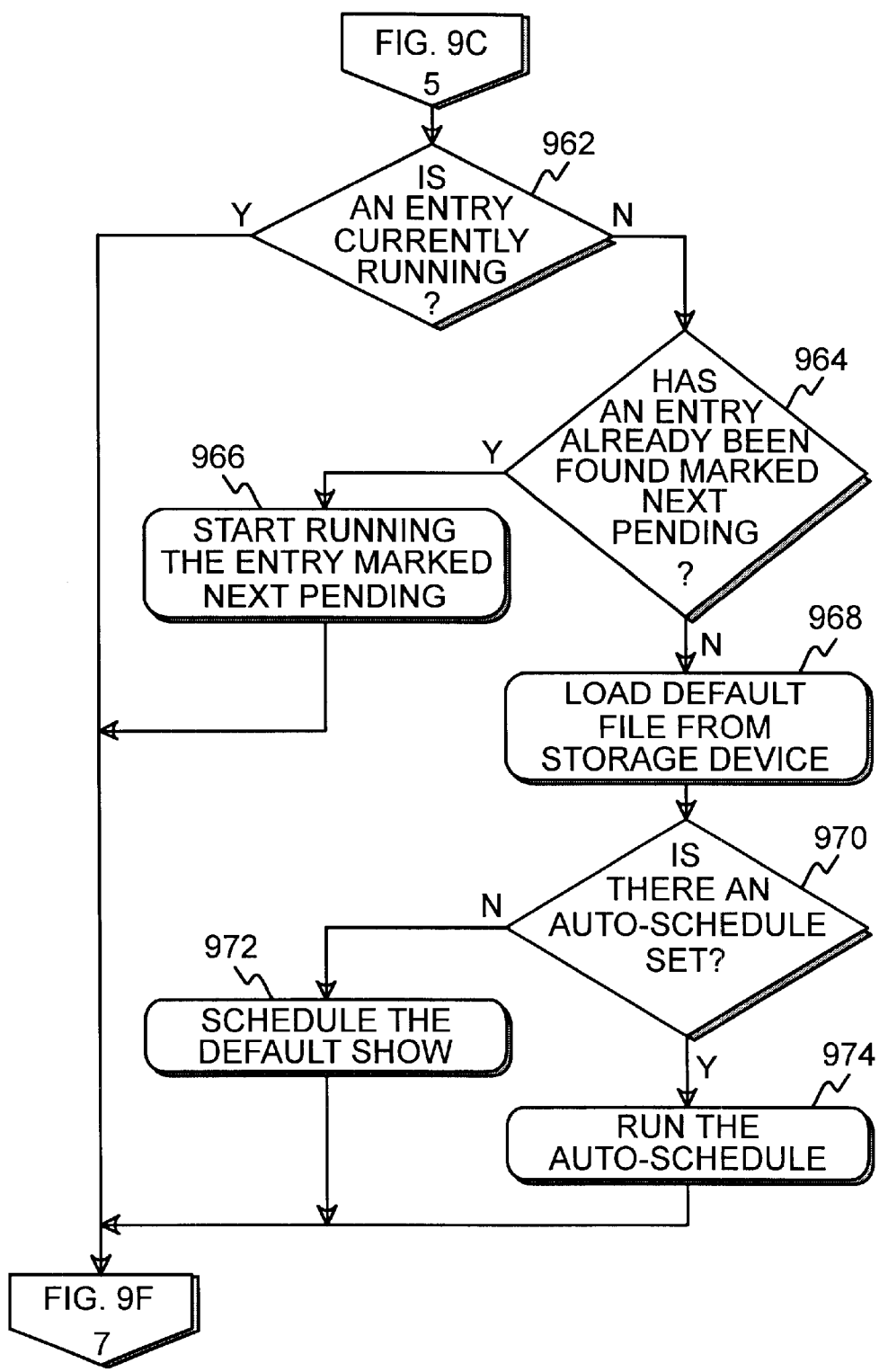

If in step 910 the interval period for the monitor from step 908 has not elapsed since it was last run, then step 914 determines if the monitor from step 908 is the last monitor in the monitor configuration file. If it is not, control returns to step 908 to retrieve the next monitor from the monitor configuration file. If the answer in step 914 is yes, then step 916 (FIG. 9B) determines if any child processes have finished. If not, control passes to step 930 (FIG. 9C). If in step 916 a child process has finished, then step 918 determines if the child process that finished was a monitor. If the answer is no, then in step 920 the entry that finished is logged as finished and control passes to step 930 (FIG. 9C).

If the child process that finished in step 918 was a monitor, then step 922 determines if the monitor's exit value was zero. If yes, control passes to step 930 (FIG. 9C). If not, then step 924 logs that the monitor exited with a non-zero value and step 926 calls the alert for this monitor. Control then passes to step 930 (FIG. 9C).

In step 930 the runner command loads the pending file from storage device 112 (FIG. 1). The pending file is the queue of programs established from the program schedule that was created for the station. The pending file contains a number of entries representing shows, programs, barriers, ads, commands, etc., included in the program schedule. Step 932 gets the first entry in the pending file, and once the first entry is retrieved, it is referred to as the current entry. When the runner command is done processing the current entry, the next entry in the pending file is retrieved, and the next entry becomes the current entry for processing by the runner command, etc.

Step 934 determines if the current entry is marked done or skipped. Each entry can be remembered in several ways depending upon the entry's status, such as done, skipped, airing, pending, barrier, or live barrier. An entry marked done indicates that the program or show represented by the entry was executed. An entry marked skipped indicates that the program or show represented by the entry was not aired because of a barrier caused it to be skipped. If the answer in step 934 is yes, indicating that the current entry is marked either done or skipped, then control passes to step 948.

If step 934 determines that the current entry is not marked done or skipped, then step 936 determines if the current entry is marked running, pending, or barrier. If the current entry is marked running, which indicates that the last time the runner command was executed the program or show represented by the current entry was being aired, then control passes to step 938 which determines if the program or show represented by the current entry is still running. If the answer in step 938 is yes, then in step 940 the current entry is remembered as still running. Control then passes to step 948. If the answer in step 938 is no, then in step 942 the current entry is marked as done, and an entry is made into a historical log that the program or show represented by the current entry is finished airing. Control then passes to step 948.

If step 936 determines that the current entry is marked pending, then control passes to step 944 which determines if another entry has already been found marked pending in the current execution of the runner command. If the answer is yes, then control passes to step 948. If the answer in step 944 is no, then in step 946 the current entry is remembered as the next pending entry. Control then passes to step 948.

If step 936 determines that the current entry is marked barrier, then control passes to step 950 (FIG. 9D) which determines if the barrier is set for a time in the future (that is, the barrier time is greater than the current time). If the answer is yes, then in step 952 the current entry is remembered as the first unreached barrier. Control then passes to step 948 (FIG. 9C).

If step 950 determines that the barrier is set for a time not in the future (that is, the barrier time is less than or equal to the current time and therefore has already occurred), then step 954 determines if another entry has already been found running in this execution of the runner command. If the answer is no, then step 956 determines if one or more other entries have already been found marked pending in this execution of the runner command. If the answer in step 956 is no, then control passes to step 948 (FIG. 9C). If the answer in step 956 is yes, then in step 958 all of the other entries already found marked pending in this execution of the runner command are marked as skipped. Control then passes to step 948 (FIG. 9C).

If step 954 determines that another entry has already been found marked running in this execution of the runner command, then step 960 stops the running command and analysis of the queue ends.

Figure 9F:
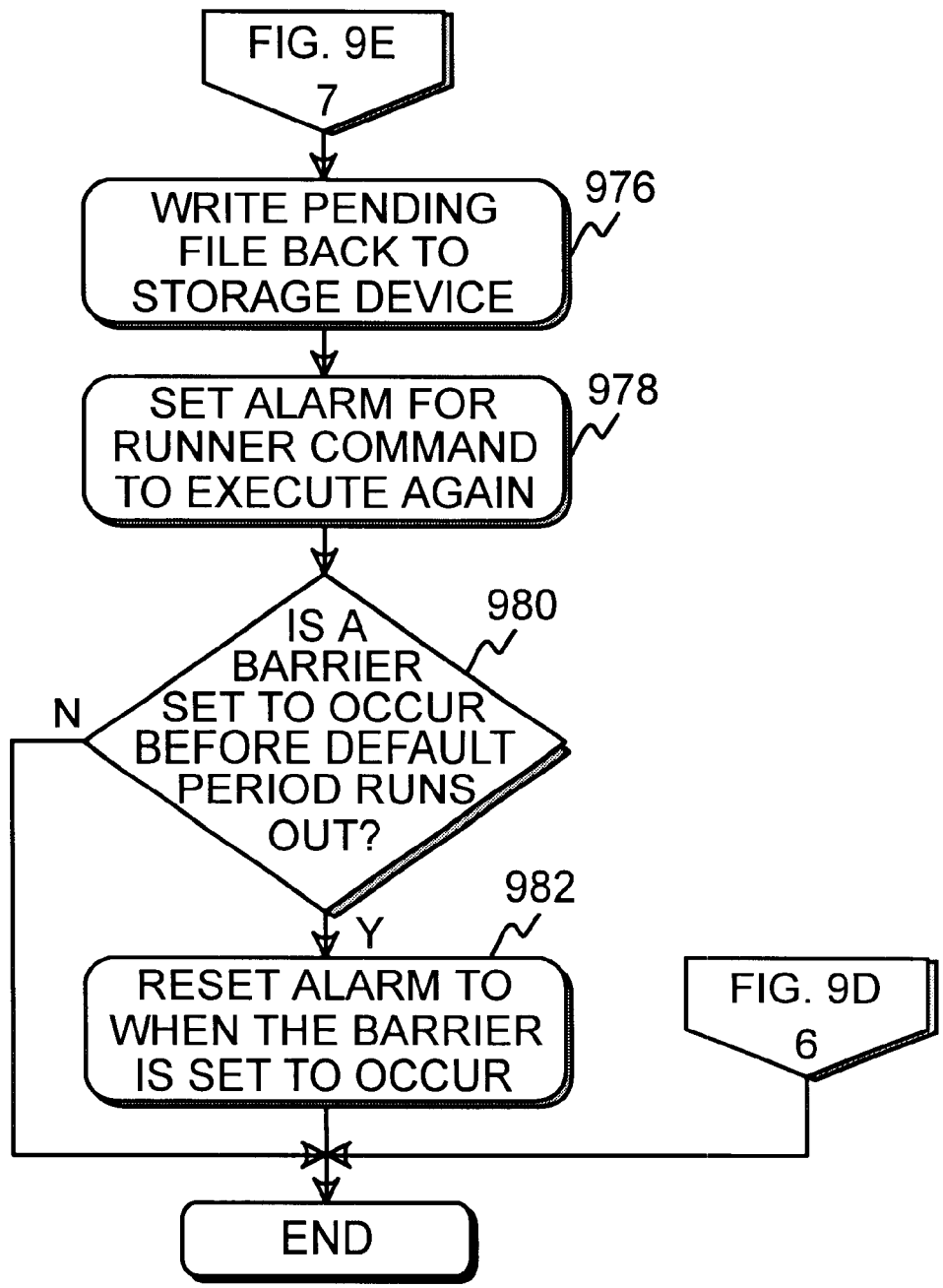

Step 948 determines if the current entry is the last entry in the pending file. If the answer is no, then control returns to step 932 where the next entry is retrieved from the pending file. If the answer in step 948 is yes, then control passes to step 962 (FIG. 9E) which determines if an entry is currently running. If the answer is yes, then control passes to step 976 (FIG. 9F). If step 962 determines that there is no entry currently running, then step 964 determines if an entry has already been found marked next pending. If the answer is yes, then step 966 starts running the entry marked next pending. Control then passes to step 976 (FIG. 9F).

If step 964 determines that no entry has already been found marked next pending, then step 968 loads the default file for this station from storage device 112. Step 970 determines if there is an auto-schedule set in the default file. If the answer is no, then step 972 schedules the default show for running. Control then passes to step 976 (FIG. 9F). If step 970 determines that there is an auto-schedule set in the default file, then step 974 runs the auto-schedule. Control then passes to step 976 (FIG. 9F).

Step 976 writes the pending file back to storage device 112, preserving the changes made to the entries regarding how they were marked by this execution of the runner command. Step 978 sets an alarm for the runner command to execute again after the default period of time runs out. Step 980 determines if a barrier is set to occur before the default period of time will run out. If the answer is yes, then step 982 resets the alarm to when the barrier is set to occur and execution of the runner command ends.

If step 980 determines that no barrier is set to occur before the default period of time runs out, then execution of the runner command ends.

Figure 10:
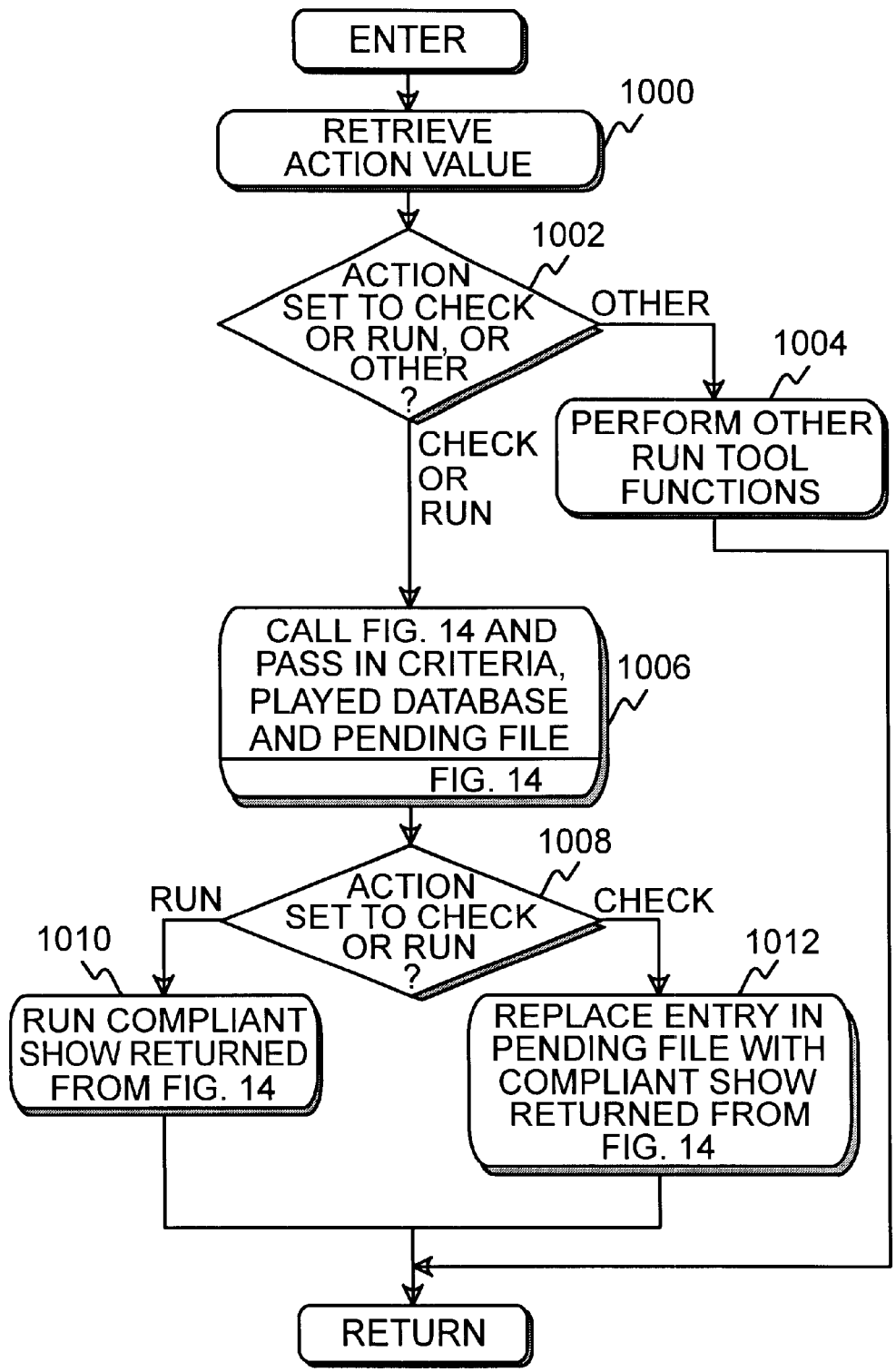
FIG. 10 shows a flow chart of the run tool used in conjunction with the runner command for DMCA/SRPC compliance checking in the system of the present invention.

FIG. 10 shows a flow chart of the run tool used in conjunction with the runner command for DMCA/SRPC compliance checking in the system of the present invention. A tool is just a program that will run when called and is like a plug-in. A tool has to have certain parameters defined in order to be valid. An environment variable, called an action, must be set and a tool must handle different types of actions that the environment variable can be set to. One type of action the environment variable can be set to is check. Setting the variable to check is a way for the user to ask the tool if the tool believes it is going to be able to execute properly.

For example, a tool having its action set to check may see if the file it is supposed to act upon exists, and then exit with a particular value depending upon whether or not it can run. The check feature is useful for sending output to a graphics display to alert the user to potential problems, such as displaying a cell in a different color to indicate non-compliance.

Another type of action the environment variable action can be set to is run, which means the tool is going to actually execute the command. Another type of action is called usage. Usage tells the user how the particular tool is used, such as what arguments it takes. The run tool-based DMCA/SRPC compliance checking needs to handle the run and check types of actions.

Referring now to FIG. 10, before execution, the run tool must be placed as an entry in the queue via any of the methods provided for by the system. When the runner command of FIG. 9 detects the run tool in the queue, it calls the process of FIG. 10. Step 1000 retrieves the action value from the run tool and step 1002 determines if the action has been set to check or run, or some other type. If it is set to some other type besides check or run, no compliance checking will be done, and in step 1004 the run tool will perform functions associated with the other type, and then return control to the calling program. If step 1002 determines that action is set to check or run, then step 1006 calls FIG. 14 to perform DMCA/SRPC compliance checking and passes into FIG. 14 the pending file and other criteria from the calling program, including the played database, which is a database containing all of the songs, shows, or programs that have been aired for a period of time. One skilled in the art will recognize that the played database could be incorporated into the process of FIG. 14 rather than passing it in each time FIG. 14 is called.

Upon returning from FIG. 14, step 1008 determines if the action was set to check or run. If the action was set to run, then in step 1010 the compliant show returned from FIG. 14 is run. If the action in step 1008 was set to check, then in step 1012 the entry in the pending file for the run tool is replaced with the DMCA/SRPC compliant show returned from FIG. 14. After either steps 1010 or 1012, control returns to the runner command.

Figure 11:
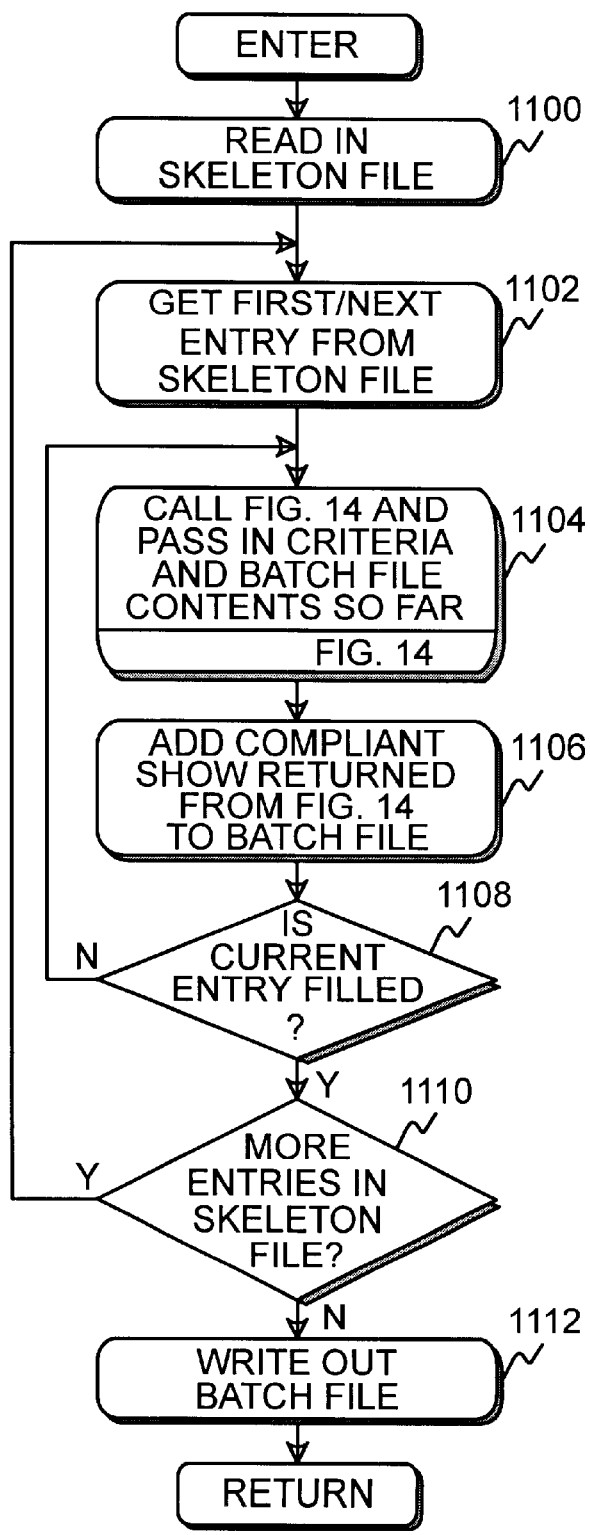
FIG. 11 shows a flow chart of batch file generation in conjunction with DMCA/SRPC compliance checking in the system of the present invention.

FIG. 11 shows a flow chart of batch file generation in conjunction with DMCA/SRPC compliance checking in the system of the present invention. Referring now to FIG. 11, after the user selects Manage Stations tab 304 and Batch Editor button 318 (FIG. 5), in step 1100 a skeleton file is read into the batch file editor. In step 1102 the first entry from the skeleton file is retrieved. The entries in the skeleton file represent different types of programming desired by the user and for a determined duration. Step 1104 calls FIG. 14 to perform DMCA/SRPC compliance checking and passes into FIG. 14 criteria, including the current entry from the skeleton file and the Contents Database, and the batch file contents generated so far.

Upon returning from FIG. 14, in step 1106 the compliant show returned from FIG. 14 is added to the contents of the batch file. Step 1108 determines if the current entry from the skeleton file is filled. For example, if two hours of a type of programming from the current entry are required, and the programs added to the batch file so far total only one hour, then more programs of the type specified in the current entry need to be added. If more programs are needed, control returns to step 1104 which again calls FIG. 14. If step 1108 determines that the current entry is filled, then step 1110 determines if there are more entries remaining in the skeleton file. If the answer is yes, then control returns to step 1102 where the next entry in the skeleton file is retrieved. If the answer in step 1110 is no, then in step 1112 the batch file is written to storage device 112 (FIG. 1). Control then returns to Internet broadcasting software 122.

Creating a batch file in the above manner produces a batch file that is DMCA/SRPC compliant within itself. However, this does not guarantee that when the batch file is inserted into the existing queue that DMCA/SRPC compliance will still be met. Shows and programs aired prior to the batch file could affect the DMCA/SRPC compliance of shows and programs following within the batch file.

Figure 12:
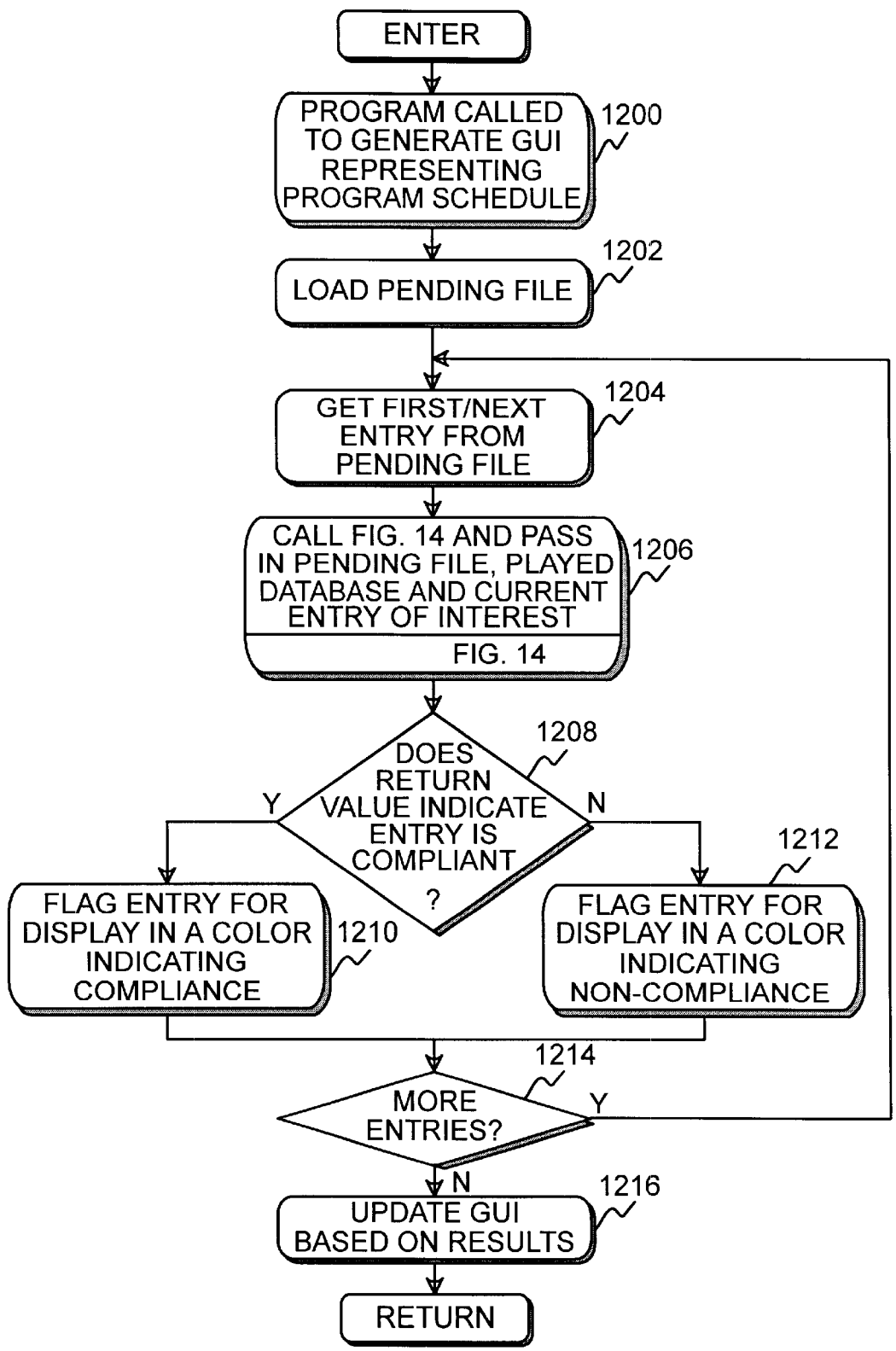
FIG. 12 shows a flow chart of displaying the program schedule in conjunction with DMCA/SRPC compliance checking in the system of the present invention.

FIG. 12 shows a flow chart of displaying the program schedule in conjunction with DMCA/SRPC compliance checking in the system of the present invention. Referring now to FIG. 12, the program to generate the graphical user interface that displays the program schedule as depicted in FIG. 3 is called in step 1200. The pending file is loaded from storage device 112 (FIG. 1) in step 1202. In step 1204 the first entry in the pending file is retrieved. Step 1206 calls FIG. 14 to perform DMCA/SRPC compliance checking and passes into FIG. 14 the pending file, the played database, and the current entry of interest from step 1204. One skilled in the art will recognize that the played database could be incorporated into the process of FIG. 14 rather than passing it in each time FIG. 14 is called.

Upon returning from FIG. 14, step 1208 determines if the return value from FIG. 14 indicates that the current entry of interest is DMCA/SRPC compliant. If the answer is yes, then step 1210 flags the current entry for display in a color indicating compliance. If the answer in step 1208 is no, indicating that the current entry is not DMCA/SRPC compliant, then step 1212 flags the current entry for display in a color indicating non-compliance.

After either steps 1210 or 1212, control passes to step 1214 which determines if there are more entries in the pending file. If the answer is yes, control returns to step 1204 where the next entry in the pending file is retrieved. If the answer in step 1214 is no, then step 1216 updates the graphical user interface to display the entries in the program schedule based on the results of the above processing, with compliant shows or programs being displayed in one color, and non-compliant shows or programs being displayed in a different color. In the preferred embodiment of the invention, compliant programs are displayed in the normal colors based on the show's status, and non-compliant programs are displayed in an orange cell with blue text. Cell and text colors can be configured by the user.

Figure 13:
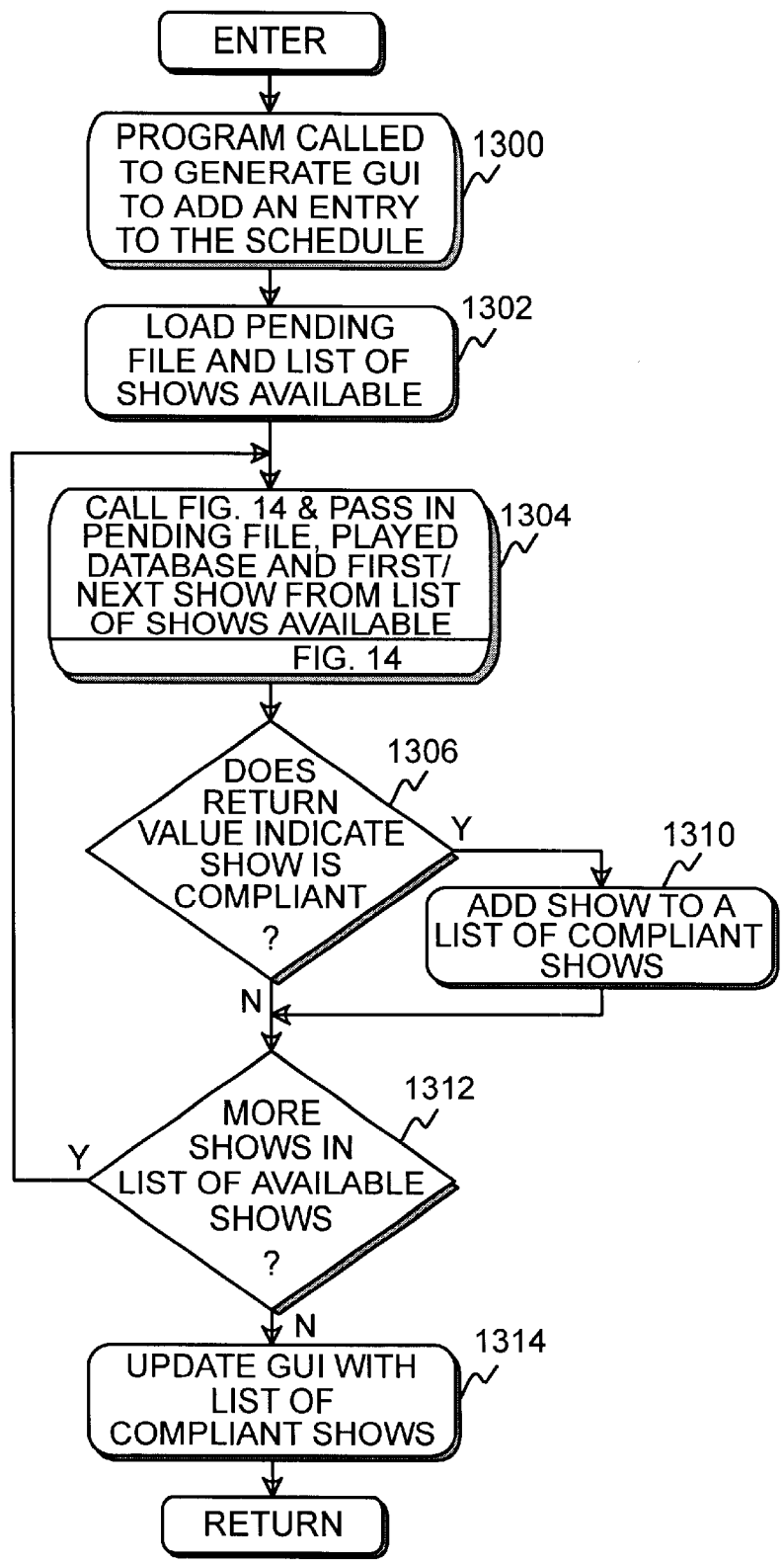
FIG. 13 shows a flow chart of show insertion in conjunction with DMCA/SRPC compliance checking in the system of the present invention.

FIG. 13 shows a flow chart of show insertion in conjunction with DMCA/SRPC compliance checking in the system of the present invention. Referring now to FIG. 13, in step 1300 the program that generates the graphical user interface to add an entry to the program schedule as depicted in FIG. 3 is called. In step 1302 the pending file is loaded from storage device 112 (FIG. 1), and the list of available shows for the current station is loaded from the Contents Database. Step 1304 calls FIG. 14 and passes in the pending file, the played database, and the first show from the list of shows available. One skilled in the art will recognize that the played database could be incorporated into the process of FIG. 14 rather than passing it in each time FIG. 14 is called.

Upon returning from FIG. 14, step 1306 determines if the return value from FIG. 14 indicates that the first show is compliant. If the show is compliant, then in step 1310 the show becomes the first entry in a list of compliant shows. If the determination in step 1306 is that the show is not compliant, then control goes to step 1312.

After either steps 1306 or 1310, control passes to step 1312 which determines if there are more shows in the list of available shows. If the answer is yes, then control returns to step 1304 which calls FIG. 14 again and passes in the pending file and the next show from the list of available shows. If step 1312 determines that there are no more shows in the list of shows, then in step 1314 the graphic user interface is updated to display the list of compliant shows. Control then returns to the add an entry program, where the user can now select a compliant show from the list of compliant shows to add to the program schedule.

Figure 14A:
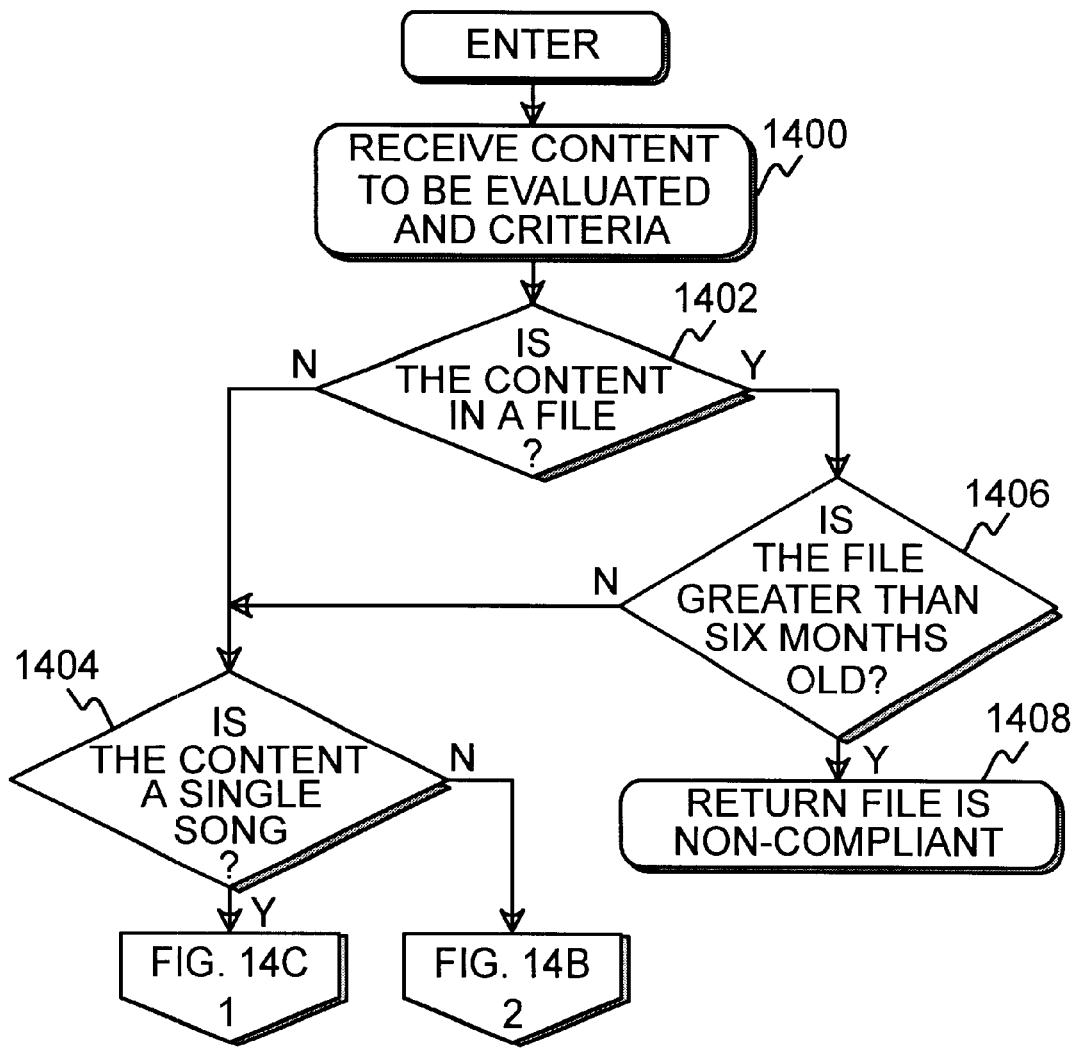
FIGS. 14A, 14B, 14C, 14D, and 14E show a flow chart of DMCA/SRPC compliance checking in the system of the present invention.
Figure 14B:
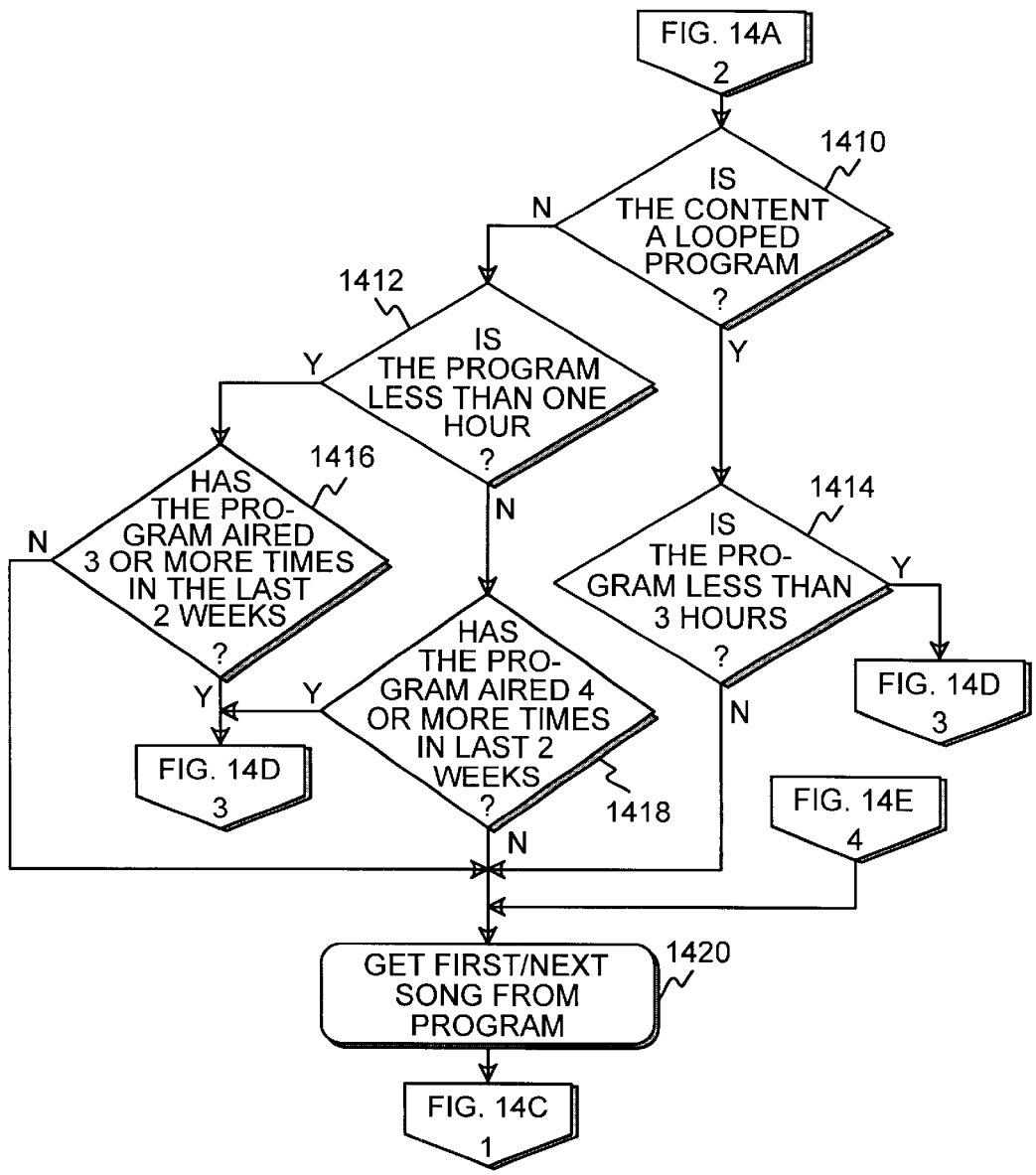

FIGS. 14A, 14B, 14C, 14D, and 14E show a flow chart of DMCA/SRPC compliance checking in the system of the present invention. Referring now to FIG. 14A, step 1400 receives the content to be evaluated from a calling function, plus any other criteria passed in from the calling function. Such criteria may include a single show, a program, a batch file, the pending file, the Contents Database, the played database, a list of shows already determined to be compliant but not yet scheduled, etc. FIG. 14 may be called from FIGS. 10, 11, 12, or 13. One skilled in the art will recognize that the played database and the Contents Database could be incorporated into the process of FIG. 14 rather than passing them in each time FIG. 14 is called. Based upon the calling figure and the criteria passed in to FIG. 14, FIG. 14 may return an indication that a show or program is compliant, or return a compliant show or program.

Step 1402 determines if the content received in step 1400 to be evaluated is in a file. If yes, then step 1406 determines if the file was created more than six months ago. If the answer is yes, then step 1408 returns that the file is non-compliant to the calling function. If step 1406 determines that the file was created less than six months ago, control passes to step 1404.

Figure 14C:
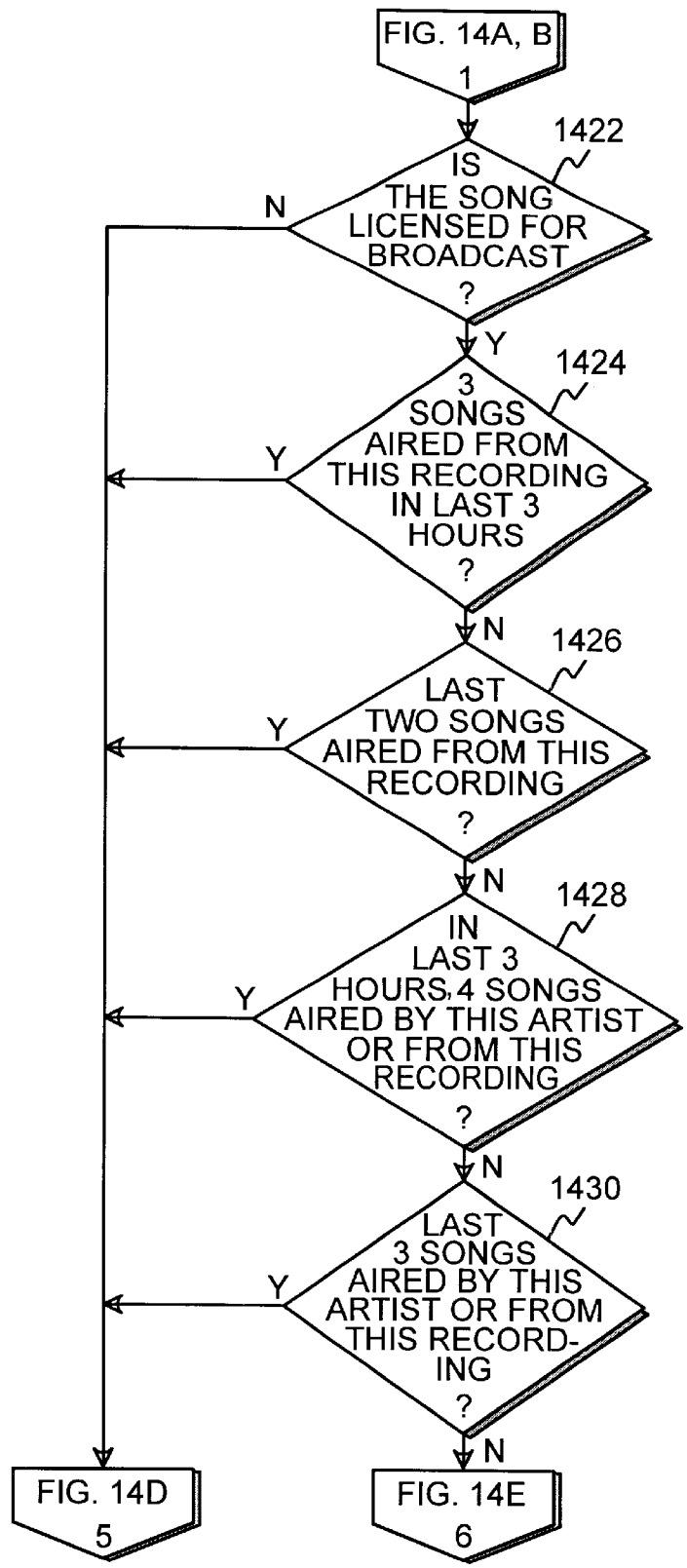
Figure 14D:
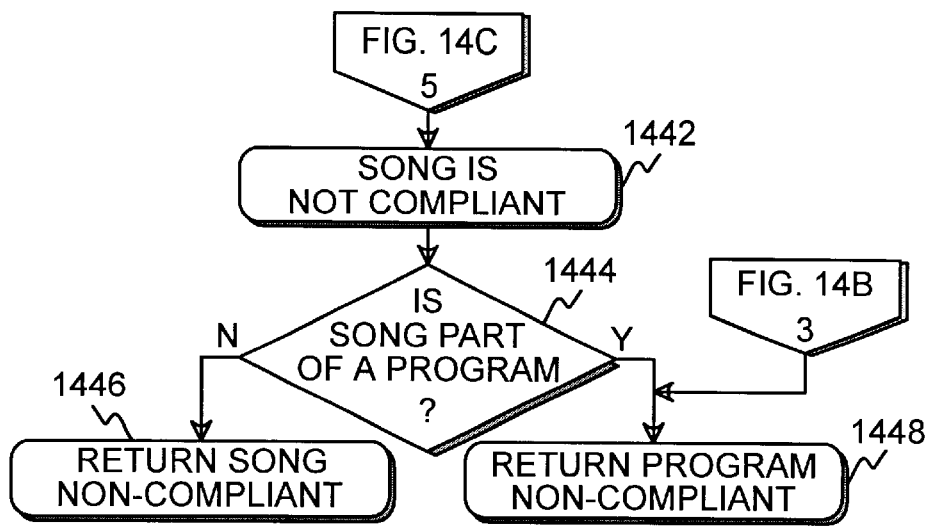
Figure 14E:
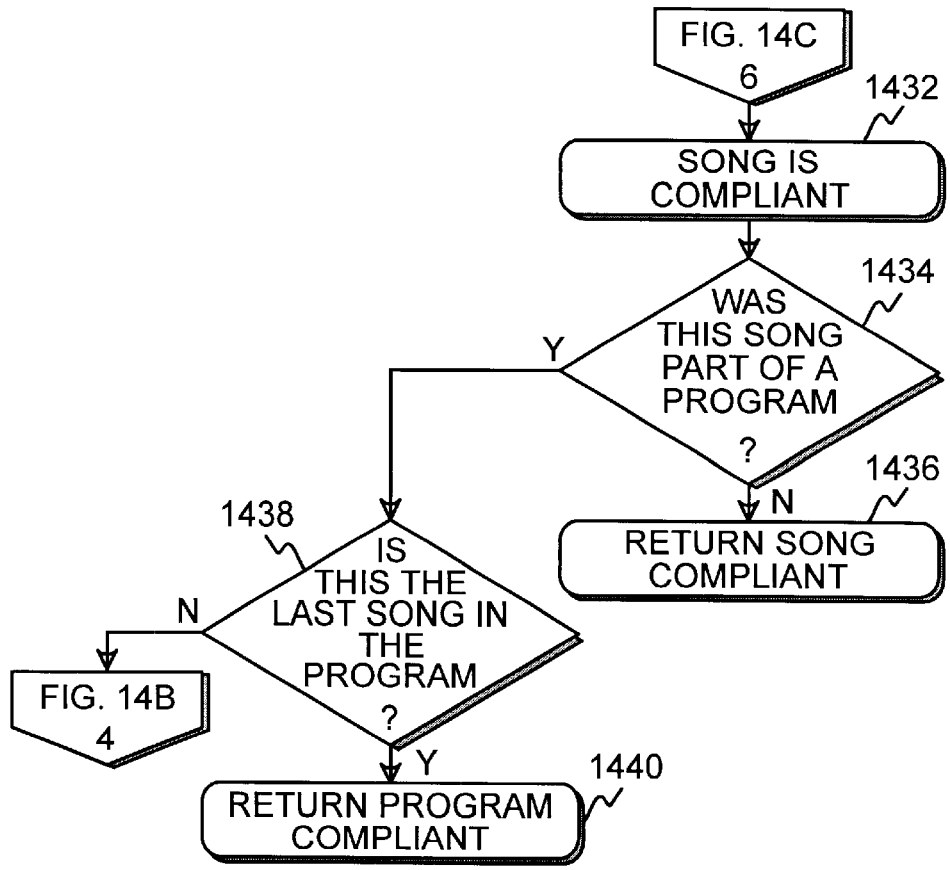

If step 1402 determines that the content is not a file, then step 1404 determines if the content to be evaluated is a single song. If the answer is yes, then control passes to step 1422 (FIG. 14C). If step 1404 determines that the content to be evaluated is not a single song, then step 1410 (FIG. 14B) determines if the content to be evaluated is a looped program. If yes, then step 1414 determines if the looped program is less than three hours in length. If yes, control passes to step 1448 (FIG. 14D). If step 1414 determines that the looped program is greater than three hours in length, then control passes to step 1420.

If the determination in step 1410 is that the content to be evaluated is not a looped program, then step 1412 determines if the program is less than one hour in length. If yes, then step 1416 determines if the program has aired three or more times in the last two weeks. If the answer is yes, then control passes to step 1448. If step 1416 determines that the program has not aired three or more times in the last two weeks, then control passes to step 1420.

If the determination in step 1412 is that the program is not less than one hour in length, then step 1418 determines if the program has aired four or more time in the last two weeks. If yes, then control passes to step 1448 (FIG. 14D). If step 1418 determines that the program has not aired four or more times in the last two weeks, then control passes to step 1420.

Step 1420 gets the first song from the program. Step 1422 (FIG. 14C) then determines if the first song is licensed for broadcast. If the first song is not licensed for broadcast, control passes to step 1442 (FIG. 14D). If the answer in step 1422 is yes, then step 1424 determines if three or more songs have been played from the recording containing the first song of interest from step 1420 in the last three hours. If yes, control passes to step 1442 (FIG. 14D). If the answer in step 1424 is no, then step 1426 determines if the last two songs aired are from the recording containing the first song of interest from step 1420. If yes, control passes to step 1442 (FIG. 14D). If the answer in step 1426 is no, then step 1428 determines if, in the last three hours, four or more songs have aired by the artist of the song of interest from step 1420, or from the recording containing the song of interest from step 1420. If yes, control passes to step 1442 (FIG. 14D). If the answer in step 1428 is no, then step 1430 determines if the last three songs aired were by the artist of the song of interest from step 1420, or from the recording containing the song of interest from step 1420. If yes, control passes to step 1442 (FIG. 14C). If the answer in step 1430 is no, then step 1432 (FIG. 14E) declares the song of interest from step 1420 to be DMCA/SRPC compliant.

Step 1434 then determines if the song of interest from step 1420 was part of a program. If the song was not part of a program, then step 1436 returns the song of interest from step 1420 as DMCA/SRPC compliant, or returns an indication that the song of interest from step 1420 is DMCA/SRPC compliant, to the calling function. If step 1434 determines that the song of interest from step 1420 was part of a program, then step 1438 determines if the song of interest from step 1420 is the last song in the program. If it is not the last song in the program, control returns to step 1420 (FIG. 14B) where the next song is retrieved from the program. If the answer in step 1438 is yes, then step 1440 returns the program containing the song of interest from step 1420 as DMCA/SRPC compliant, or returns an indication that the program containing the song of interest from step 1420 is DMCA/SRPC compliant, to the calling function.

Step 1442 (FIG. 14D) declares the song of interest from step 1420 to be DMCA/SRPC non-compliant. Step 1444 determines if the song of interest from step 1420 is part of a program. If it is not part of a program, then step 1446 returns the song of interest from step 1420 as DMCA/SRPC non-compliant to the calling function. If the answer in step 1444 is yes, then step 1448 returns the program containing the song of interest from step 1420 or the program from step 1414 as being DMCA/SRPC non-compliant to the calling function.

Having described a presently preferred embodiment of the present invention, it will be understood by those skilled in the art that many changes in construction and circuitry and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A computer implemented method for creating and managing at least one channel for broadcasting over a network, said method comprising the steps of:

(a) generating at least one entry for broadcast on said at least one channel over said network;

(b) inserting said at least one entry into a pending file;

(c) activating a runner command, wherein when no entry from said pending file is being broadcast, said runner command examines said pending file and launches the broadcasting of a next entry from said pending file, wherein said next entry is marked as a running entry;

(d) when said runner command determines that there is no next entry in said pending file for broadcast after said running entry completes broadcasting, scheduling a default entry from a channel default setting as a next entry in said pending file;

(e) when said running entry completes broadcasting, generating a stop event, wherein said stop event indicates that no entry is being broadcast; and (f) repeating steps (c) through (e) until said at least one channel is terminated.

2. A computer implemented method for creating and managing at least one channel for broadcasting over a network according to claim 1, wherein step (a) further comprises the step (a0) performed before step (a):

(a0) creating said at least one channel with internet broadcasting software, wherein said internet broadcasting software is loaded on said computer, and further wherein said internet broadcasting software is accessed on said computer with Web browser software.

3. A computer implemented method for creating and managing at least one channel for broadcasting over a network according to claim 1, wherein step (d) further comprises the following step (d0) performed before step (d):

(d0) when said runner command determines that there is no next entry in said pending file for broadcast after said running entry completes broadcasting, calling an auto-schedule script, wherein said auto-schedule script schedules an auto file as a next entry in said pending file, and further wherein, performing step (d) only when said auto-schedule script fails to schedule said auto file as said next entry in said pending file.

4. A computer implemented method for creating and managing at least one channel for broadcasting over a network according to claim 1 wherein said at least one entry generated for broadcast is a streaming media format.

5. A computer implemented method for creating and managing at least one channel for broadcasting over a network according to claim 1 wherein said runner command is executed on a periodic basis, and further wherein, absent the occurrence of a triggering event which causes said runner command to execute upon said occurrence of said triggering event, after the passage of a predetermined period of time, said runner command executes on said periodic basis.

6. A computer implemented method for creating and managing at least one channel for broadcasting over a network said method comprising the steps of:
   (a) generating a plurality of entries for broadcast on said at least one channel over said network;
   (b) inserting said plurality of entries into a pending file;
   (c) activating a runner command, wherein when no entry from said pending file is being broadcast, said runner command examines said pending file and launches the broadcasting of a next entry from said pending file, wherein said next entry is marked as a running entry;
   (d) inserting a live barrier into said pending file at a location within said plurality of entries and after said running entry, wherein said live barrier has a set time;
   (e) entering at least one parameter for a live event, wherein said live event is associated with said live barrier;
   (f) when said runner command determines that said set time in said live barrier will occur before said next passage of said predetermined period of time, setting an alarm to cause said runner command to execute at said set time in said live barrier; and
   (g) when said set time occurs and said alarm executes, executing said runner command, wherein said runner command launches the broadcasting of said live event associated with said live barrier in said pending file.

7. A computer implemented method for creating and managing at least one channel for broadcasting over a network according to claim 6, further comprising the steps of:
   (h) selecting at least one entry from said plurality of entries;
   (i) selecting at least one advertisement file from a plurality of advertisement files; and
   (j) associating said at least one advertisement file with said at least one entry, wherein immediately prior to when said at least one entry is broadcast, said at least one advertisement file is broadcast, and said at least one entry is broadcast immediately thereafter.

8. A computer implemented method for creating and managing at least one channel for broadcasting over a network according to claim 7, wherein step (j) is replaced by the following new step (j):
   (j) associating said at least one advertisement file with said at least one entry, wherein immediately after when said at least one entry is broadcast, said at least one advertisement file is broadcast.

9. A computer implemented method for creating and managing at least one channel for broadcasting over a network according to claim 7, wherein step (j) is replaced by the following new step (j):
   (j) associating said at least one advertisement file with said at least one entry, wherein at a time during when said at least one entry is broadcast, said at least one advertisement file is broadcast.

10. A computer implemented method for creating and managing at least one channel for broadcasting over a network according to claim 6, further comprising the steps of:
    (h) passing said pending file and a played database to a compliance checking routine, wherein said played database contains a plurality of shows that have been broadcast within a recent predetermined period of time;
    (i) processing a first entry of said plurality of entries in said pending file in said compliance checking routine; and
    (j) returning a value from said processing of said first entry of said plurality of entries in said compliance checking routine, wherein said value indicates a compliance status of said first entry of said plurality of entries.

11. A computer implemented method for creating and managing at least one channel for broadcasting over a network according to claim 10, further comprising the steps of:
    (k) repeating steps (i) through (j) for each of said plurality of entries;
    (l) displaying a graphical representation of said pending file on a graphics display connected to said computer;
    (m) displaying each of said plurality of entries in said pending file whose said compliance status indicates compliance in a first color on said graphics display; and
    (n) displaying each of said plurality of entries in said pending file whose said compliance status indicates non-compliance in a second color on said graphics display.

12. A computer implemented method for creating and managing at least one channel for broadcasting over a network according to claim 6, further comprising the steps of:
    (h) inserting a run tool as one of said plurality of entries into said pending file;
    (i) when said runner command processes said run tool, passing said pending file and a played database to a compliance checking routine, wherein said played database contains a plurality of shows that have been broadcast within a recent predetermined period of time;
    (j) when an action value in said run tool is set to run, launching for broadcast a compliant show returned from said compliance checking routine; and
    (k) when an action value in said run tool is set to check, replacing said run tool entry in said pending file with said compliant show returned from said compliance checking routine.

13. A computer implemented method for creating and managing at least one channel for broadcasting over a network according to claim 6, further comprising the steps of:
    (h) reading a skeleton file into a batch file editor, wherein said skeleton file has a plurality of entries, and further wherein each of said plurality of entries represent a programming type of a predetermined duration;
    (i) creating a batch file;
    (j) retrieving a first of said plurality of entries from said skeleton file;
    (k) passing said first of said plurality of entries, a current contents of said batch file, and a contents database to a compliance checking routine;

(l) adding a compliant show returned from said compliance checking routine to said batch file;

(m) repeating steps (k) through (l) until said batch file contains said returned compliant shows of said predetermined duration; and (n) repeating steps (j) through (m) for each of said plurality of entries from said skeleton file.

14. A computer implemented method for creating and managing at least one channel for broadcasting over a network according to claim 6, further comprising the steps of:

(h) displaying a graphical representation of said pending file on a graphics display connected to said computer;

(i) passing said pending file, a first show from a list of available shows for said channel, and a played database to a compliance checking routine, wherein said played database contains a plurality of shows that have been broadcast within a recent predetermined period of time;

(j) when a return value for said first show from said list of available shows from said compliance checking routine indicates compliance, adding said first show from said list of available shows to a list of compliant shows;

(k) repeating steps (i) through (j) for each of said shows from said list of available shows; and (l) displaying said list of compliant shows in said graphics display.

15. A computer system for creating and managing at least one channel for broadcasting over a network, said computer system comprising:

a computer, said computer further comprising
an audio input/output connected to a system bus in said computer for receiving audio analog signals and for outputting said audio analog signals;
a memory connected to said system bus, said memory further comprising
encoder software for converting said audio analog signals into digital format signals;
internet broadcasting software for creating said at least one channel, and for generating at least one entry derived from said digital format signals for broadcast on said channel over said network, wherein said at least one entry is stored in a pending file in said memory, and for activating a runner command within said internet broadcasting software to control said broadcasting, wherein when no entry from said pending file is being broadcast, said runner command examines said pending file and launches broadcasting of a next entry from said pending file, marks said next entry as a running entry, and further wherein when said runner command determines that there is no next entry in said pending file for broadcast after said running entry completes broadcasting, scheduling a default entry from a channel default setting as a next entry in said pending file, and further wherein when said running entry completes broadcasting, said runner command launches broadcasting of a next entry from said pending file;
a communications interface connected to said system bus for receiving data and for sending said at least one entry; and
an external network connection connected to said communications interface for sending said at least one entry received from said communications interface to said network, and for receiving data from said network and sending said data to said communications interface.

16. A computer system for creating and managing at least one channel for broadcasting over a network according to claim 15, wherein said internet broadcasting software further comprises:

an auto schedule script, wherein when said runner command determines that there is no next entry in said pending file for broadcast after said running entry completes broadcasting, said auto-schedule script is called, wherein said auto-schedule script schedules an auto file as a next entry in said pending file, and further wherein, said default entry is scheduled only when said auto-schedule script fails to schedule said auto file as said next entry in said pending file.

17. A computer system for creating and managing at least one channel for broadcasting over a network according to claim 15 wherein said digital format signals are a streaming media format.

18. A computer system for creating and managing at least one channel for broadcasting over a network according to claim 15 wherein said runner command is executed on a periodic basis.

19. A computer system for creating and managing at least one channel for broadcasting over a network according to claim 15, further comprising:

a graphics display connected to said system bus, wherein a graphical user interface displays a program schedule, wherein said program schedule is a graphical representation of said pending file.

20. A computer system for creating and managing at least one channel for broadcasting over a network according to claim 15, further comprising:

an operator workstation connected to said computer through a local area network, said operator workstation having a graphics display and web browser software, wherein said internet broadcasting software on said computer can be accessed by said operator workstation over said local area network through said web browser software to create and manage said at least one channel for broadcasting over said network.

21. A computer system for creating and managing at least one channel for broadcasting over a network according to claim 20, wherein said network is an intranet.

22. A computer system for creating and managing at least one channel for broadcasting over a network according to claim 20 wherein said network is the internet.

23. A computer system for creating and managing at least one channel for broadcasting over a network according to claim 22 wherein said operator workstation is connected to said internet, and further wherein said operator workstation accesses said internet broadcasting software on said computer through said internet, wherein said internet is connected to said external network connection, to create and manage said at least one channel for broadcasting over said internet.

* * * * *